US012730666B2

(12) United States Patent
Mee et al.

(10) Patent No.: US 12,730,666 B2
(45) Date of Patent: Sep. 8, 2026

(54) SYNCHRONISING EVENT STREAMS

(71) Applicant: nChain Licensing AG, Zug (CH)

(72) Inventors: Andrew James Mee, London (GB); Ricky Charles Rand, London (GB)

(73) Assignee: nChain Licensing AG, Zug (CH)

( * ) Notice: Subject to any disclaimer, the term of this patent is extended or adjusted under 35 U.S.C. 154(b) by 764 days.

(21) Appl. No.: 17/800,858

(22) PCT Filed: Feb. 15, 2021

(86) PCT No.: PCT/IB2021/051259
§ 371 (c)(1),
(2) Date: Aug. 18, 2022

(87) PCT Pub. No.: WO2021/165815
PCT Pub. Date: Aug. 26, 2021

(65) Prior Publication Data

US 2023/0093411 A1 Mar. 23, 2023

(30) Foreign Application Priority Data

Feb. 19, 2020 (GB) ...................................... 2002285
Dec. 21, 2020 (GB) ...................................... 2020279

(51) Int. Cl.
*G06F 9/46* (2006.01)
*G06F 9/52* (2006.01)

(52) U.S. Cl.
CPC ................ *G06F 9/466* (2013.01); *G06F 9/52* (2013.01); *H04L 2209/56* (2013.01)

(58) Field of Classification Search
CPC ......... G06F 9/466; G06F 9/52; H04L 2209/56
See application file for complete search history.

(56) References Cited

U.S. PATENT DOCUMENTS

2006/0264202 A1 11/2006 Hagmeier et al.
2016/0330034 A1* 11/2016 Back .................... G06Q 20/065
2018/0268151 A1* 9/2018 Cuomo ................. H04L 9/3236
2019/0238525 A1* 8/2019 Padmanabhan ....... H04L 63/101
2020/0084027 A1* 3/2020 Duchon ................ G06F 21/602
(Continued)

FOREIGN PATENT DOCUMENTS

AU 2017349752 A1 5/2019
CN 106339875 A 1/2017
CN 111737356 11/2020
(Continued)

OTHER PUBLICATIONS

Tu, J.; Zhang, J.; Chen, S.; Weise, T.; Zou, L. An Improved Retrieval Method for Multi-Transaction Mode Consortium Blockchain. Electronics 2020, 9, 296. https://doi.org/10.3390/electronics9020296 (Year: 2020).*

(Continued)

*Primary Examiner* — Ryan M Stiglic
(74) *Attorney, Agent, or Firm* — Galvani Smith PLLC; Rowan P. Smith

(57) ABSTRACT

The present disclosure proposes methods, devices and systems for synchronising a plurality of event streams using an atomic blockchain transaction, the transaction having multiple inputs, each spending a dust output of a previous transaction for a respective event stream among the plurality, each input having an unspent dust output and a data payload.

18 Claims, 15 Drawing Sheets

(56) References Cited

U.S. PATENT DOCUMENTS

2021/0056095 A1* 2/2021 Srivastava .......... G06F 16/2379
2021/0092127 A1* 3/2021 Li ............................ G06F 8/70

FOREIGN PATENT DOCUMENTS

| | | | |
|---|---|---|---|
| JP | 2000510659 | A | 8/2000 |
| WO | 2019014337 | A1 | 1/2019 |
| WO | 2019200402 | A1 | 10/2019 |

OTHER PUBLICATIONS

PCT/IB2021/051259 International Search Report and Written Opinion dated Apr. 21, 2021.
Orlenys Lopez-Pintado et al: "Caterpillar: A Business Process Execution Engine on the Ethereum Blockchain", arxiv.org, Cornell University Library, 201 Olin Library Cornell University Ithaca, NY 14853, Jul. 10, 2018 (Jul. 10, 2018).
Weber Ingo et al: "Untrusted Business Process Monitoring and Execution Using Blockchain", Sep. 8, 2016 (Sep. 8, 2016), ICIAP: International Conference On Image Analysis and Processing, 17th International Conference, Naples, Italy, Sep. 9-13, 2013. Proceedings; [Lecture Notes in Computer Science; Lect.Notes Computer], Springer, Berlin, Heidelberg, pp. 329-347.
Ziegeldorf Jan Henrik et al: "Secure and anonymous decentralized Bitcoin mixing", Future Generation Computer Systems, vol. 80, Dec. 31, 2016 (Dec. 31, 2016), pp. 448-466, XP085291265, ISSN: 0167-739X, DOI: 10.1016/J.FUTURE.2016.05.018 p. 450, paragraph 2.
GB2020279.2 Combined Search and Examination Report dated Apr. 22, 2021.
10-2022-7031118 Korean Office Action dated Dec. 1, 2025, 9 pages.
Lopez-Pintado, Orlenys et al., "Caterpillar: A Business Process Execution Engine on the Ethereum Blockchain", Software: Practice and Experience, 2018, pp. 1-32; URL: https://arxiv.org/abs/1808.03517.
Extended European Search Report for Application No. 26174748.9, dated Jun. 5, 2026, 8 Pages.

* cited by examiner

SYNCHRONISING EVENT STREAMS

CROSS REFERENCE TO RELATED APPLICATIONS

This application is the U.S. National Stage of International Application No. PCT/162021/051259 filed on Feb. 15, 2021, which claims the benefit of United Kingdom Patent Application No. 2002285.1, filed on Feb. 19, 2020, and United Kingdom Patent Application No. 2020279.2, filed on Dec. 21, 2020, the contents of which are incorporated herein by reference in their entireties.

TECHNICAL FIELD

This disclosure relates generally to methods and systems for implementing a platform of one or more services associated with a distributed ledger, i.e. a blockchain, for one or more clients. Particularly, the present disclosure relates, but is not limited to, the provision of access to a plurality functions and applications associated with a blockchain for one or more clients, such as the implementation of event streams or machine-readable contracts.

BACKGROUND

In this document we use the term 'blockchain' to include all forms of electronic, computer-based, distributed ledgers. These include consensus-based blockchain and transaction-chain technologies, permissioned and un-permissioned ledgers, shared ledgers, public and private blockchains, and variations thereof. The most widely known application of blockchain technology is the Bitcoin ledger, although other blockchain implementations have been proposed and developed. While Bitcoin may be referred to herein for the purpose of convenience and illustration, it should be noted that the disclosure is not limited to use with the Bitcoin blockchain, and alternative blockchain implementations and protocols associated with any kind of digital asset or a representation of a digital asset fall within the scope of the present disclosure. The terms "client", "entity", "node", "user", "sender", "recipient", "payer", "payee" may refer herein to a computing or processor-based resource. The term "Bitcoin" is used herein to include any version or variation that derives from or is based on the Bitcoin protocol. The term "digital asset" may refer to any transferrable asset, such as cryptocurrency, tokens representing at least a part of a property, a smart contract, a license, i.e. software license, or DRM contracts for media content, etc. It will be understood that the term "digital asset" is used throughout this document to represent a commodity that may be associated with a value, which may be transferred to or provided as a payment in a transaction from one entity to another.

A blockchain is a peer-to-peer, electronic ledger, which is implemented as a computer-based, decentralised, distributed system made up of blocks, which in turn are made up of transactions. Each transaction is a data structure that encodes the transfer of control of a digital asset between participants in the blockchain system and includes at least one input and at least one output. Each block contains a hash of the previous block so that blocks become chained together to create a permanent, unalterable record of all transactions which have been written to the blockchain since its inception. Transactions contain small programs known as scripts, embedded into their inputs and outputs, which specify how and by whom the outputs of the transactions can be accessed. On the Bitcoin platform, these scripts are written using a stack-based scripting language.

In order for a transaction to be written to the blockchain it must be "validated". Network nodes (miners) perform work to ensure that each transaction is valid, with invalid transactions rejected from the network. Software clients installed on the nodes perform this validation work on an unspent transaction (UTXO) by executing its locking and unlocking scripts. If execution of the locking and unlocking scripts evaluate to TRUE, the transaction is valid, and the transaction is then written to the blockchain. Thus, in order for a transaction to be written to the blockchain, it must be i) validated by the first node that receives the transaction—if the transaction is validated, the node relays it to the other nodes in the network; ii) added to a new block built by a miner; and iii) mined, i.e. added to the public ledger of past transactions.

It will be appreciated that the nature of the work performed by miners will depend on the type of consensus mechanism used to maintain the blockchain. While proof of work (PoW) is associated with the original Bitcoin protocol, it will be appreciated that other consensus mechanisms, such as, proof of stake (PoS), delegated proof of stake (DPoS), proof of capacity (PoC), proof of elapsed time (PoET), proof of authority (PoA) etc. may be used. Different consensus mechanisms vary in how mining is distributed between nodes, with the odds of successfully mining a block depending on e.g. a miner's hashing power (PoW), an amount of cryptocurrency held by a miner (PoS), an amount of cryptocurrency staked on a delegate miner (DPoS), a miner's ability to store pre-determined solutions to a cryptographic puzzle (PoC), a wait time randomly assigned to a miner (PoET), etc. Typically, miners are provided with an incentive or reward for mining a block. The Bitcoin blockchain, for example, rewards miners with newly issued cryptocurrency (Bitcoin) and fees associated with transactions in the block (transaction fees). For the Bitcoin blockchain, the amount of cryptocurrency issued diminishes with time, with the incentive eventually consisting of transaction fees only. It will be appreciated, therefore, that the handling of transaction fees is a part of the underlying mechanism for committing data to public blockchains such as the Bitcoin blockchain.

As mentioned previously, each transaction in a given block encodes the transfer of control of a digital asset between participants in the blockchain system. The digital asset need not necessarily correspond to a cryptocurrency. For example, the digital asset may pertain to a digital representation of a document, image, physical object, etc. The payment of cryptocurrency and/or transaction fees to miners may simply act as an incentive to maintain the validity of the blockchain by performing the necessary work. It may be that the cryptocurrency associated with the blockchain acts as a security for miners, with the blockchain itself being a ledger for transactions that predominantly relate to digital assets other than cryptocurrency. In some cases, it may be that the transfer of cryptocurrency between participants is handled by an entity that is different from and/or independent of the entity using the blockchain to maintain a ledger of transactions.

Once stored in the blockchain as a UTXO, a user can transfer control of the associated resource to another address associated with an input in another transaction. This transfer is usually, but not essentially, done using a digital wallet. This digital wallet may be a device; physical medium; program; application (app) on a computing device such as a desktop, laptop or a mobile terminal; or a remotely-hosted service, associated with a domain on a network, such as the Internet. The digital wallet stores public and private keys and can be used to track ownership of resources; tokens and assets etc., that are associated with a user; receive or spend digital assets; transfer tokens which may relate to digital assets, such as cryptocurrencies, licences, property, or other types of resource.

Although blockchain technology is most widely known for the use of cryptocurrency implementation, digital entrepreneurs are exploring the use of both the cryptographic security system Bitcoin is based on, and the data that can be stored on the Blockchain to implement new systems. It would be highly advantageous if the blockchain could be used for automated tasks and processes which are not limited to the realm of cryptocurrency. Such solutions would be able to harness the benefits of the blockchain (e.g. a permanent, tamper-proof records of events, distributed processing etc.) while being more versatile in their applications.

One area of current research is the use of the blockchain for the implementation of "smart contracts". These are computer programs designed to automate the execution of the terms of a machine-readable contract or agreement. Unlike a traditional contract which would be written in natural language, a smart contract is a machine-executable program, which comprises rules that can process inputs in order to produce results, which can then cause actions to be performed dependent upon those results. Another area of blockchain-related interest is the use of 'tokens' (or 'coloured coins') to represent and transfer real-world entities via the blockchain. A potentially sensitive or secret item can be represented by the token, which has no discernible meaning or value. The token thus serves as an identifier that allows the real-world item to be referenced from the blockchain.

The above-mentioned examples or scenarios, whilst making use of the advantages of the blockchain to provide a permanent, tamper-proof record of events; requires a client, client entity, computing devices, or a terminal associated with a client, to include or implement software and/or hardware, or a processor/module, such as a digital wallet for implementing functionality for managing digital assets, managing cryptographic keys for Elliptic Curve Digital Signature Algorithm (ECDSA) that are used, for example, by the BSV (Bitcoin Satoshi's Vision) Blockchain. In addition, there is also a requirement for the client device to be able to implement blockchain transaction construction and have access to BSV libraries. Thus, not only do clients need to include processing to implement such functionality, but they also need to ensure that appropriate security measures are implemented for such processes before they can make use of a blockchain network to send, receive, and view data, and/or digital assets, which relate to a smart contract or a token representing a real world asset transaction.

Accordingly, there is a desire to implement secure, low-complexity, user-friendly, efficient, and robust techniques, that will allow any client, whether computationally sophisticated or not, to be able to instantaneously access and interact with useful applications associated with the blockchain, in a simple, fast, accurate, reliable, and secure manner, that is computationally and functionally less onerous. More particularly, there is a desire to make use of distributed ledger (blockchain) technology, and the advantages of increased security, transparency, and reliability of records, to provide a common platform or interface for a plurality of blockchain related services or applications, that enable any client computing device to ensure any data, event, or digital asset associated with the client, can be instantaneously and securely mined, or written into the blockchain easily, thereby providing a lasting, tamper-proof, and auditable record of it, which can be created, written, updated, read, or viewed as required.

Such an improved solution has now been devised. The present disclosure addresses the above technical concerns by proposing one or more techniques, whereby data, or information associated with a client, may be simply, securely, and instantaneously written into, or obtained from the blockchain, by methods, devices, and systems which provide an application programming interface (API) for one or more services associated with a blockchain, without such clients needing to implement any processing or functionality for using the blockchain, while still being able to avail all advantages associated with the blockchain.

SUMMARY

In a first aspect, the present disclosure proposes methods, devices, and systems for implementing a platform, that provides a plurality of services associated with a blockchain; using a platform processor associated with an application programming interface (API), that is capable of receiving a client request in a Hypertext Transfer Protocol (HTTP) transmission protocol format for a service. Further to suitable verification of the identity of the client and/or the request, a destination address, or endpoint for the requested blockchain service, is determined, and at least one blockchain transaction is generated based on the destination address in order to obtain an output script. A result based on the output script is then sent to the given client in the HTTP transmission protocol format.

In a second aspect, the present disclosure proposes methods, devices, and systems for implementing a data-writing service, for transactions associated with a blockchain for a client, based on an HTTP request from the client, and relating to an event stream ES, implemented using the blockchain, where the event stream may be used to representor track a Finite State Machine (FSM). For example, this FSM may be a smart contract. The current state of the event Stream $ES_n$ on the blockchain is determined, a new or next event $E_{n+1}$ for the event stream ES, is identified in the received request, and processed by creating a blockchain transaction, including an input associated with a transaction output from a previous transaction TX, for the event stream ES; and an unspent output UTXO, associated with event data representing the new event $E_{n+1}$. Once submitted to the blockchain, the current state of the event stream on the blockchain is updated to be $ES_{n+1}$, based on the new event $E_{n+1}$. A result associated with current state $ES_{n+1}$, the result being provided in the HTTP transmission protocol format.

In a third aspect, the present disclosure proposes methods, devices, and systems, for providing, creating, updating, and/or terminating an event stream that is implemented using the blockchain, and creating a tamper-proof log or record of events associated with the event chain. An event $E_n$ for the event stream ES is identified in the received request and represents the current length of the event stream ES. If n=0, so that $E_n$ is the first event to create the event stream ES, then a blockchain transaction is created, including an unspent output that is a dust output. If $0 \leq n \leq N$, where N is the final or maximum value for n, so that $E_n$ is an event to amend the event stream ES, then a blockchain transaction is created including a first input, spending a dust output associated with a previous transaction for the event stream; an unspent transaction output being a dust output for the current transaction; and an unspent transaction output being associated with event data representing the current event $E_n$. If n=N, so that $E_n$ is an event to terminate the event stream ES, then a blockchain transaction is created including a first input, spending a dust output associated with a previous transaction for the event stream; an unspent transaction output being associated with a digital asset that is above a defined dust output limit. Once the created transaction is accepted and/or submitted to the blockchain, a result associated with the transaction is provided in the HTTP transmission protocol format. In some embodiments one or more transactions in the event stream, while being accepted or being a valid transaction for a given event stream, are not submitted to the blockchain immediately. For instance, the transactions in an event stream will be submitted to a block after a given number or transactions or time has elapsed, i.e. after 25 or so transactions in an event stream have taken place, for example. The transactions may be held in a mempool until the number or time has elapsed. In other embodiments, it is possible that a transaction in an event stream is submitted to the blockchain instantaneously.

In a fourth aspect, the present disclosure proposes methods, devices, and systems, for synchronising multiple event streams associated with the blockchain using an atomic blockchain transaction.

Throughout this specification the word “comprise”, or variations such as “includes”, “comprises”, or “comprising”, will be understood to imply the inclusion of a stated element, integer, step, or group of elements, integers, or steps, but not the exclusion of any other element, integer, step, or group of elements, integers, or steps.

BRIEF DESCRIPTION OF THE DRAWINGS

Aspects and embodiments of the present disclosure will now be described, by way of example only, and with reference to the accompany drawings, in which.

DETAILED DESCRIPTION

Figure 1:
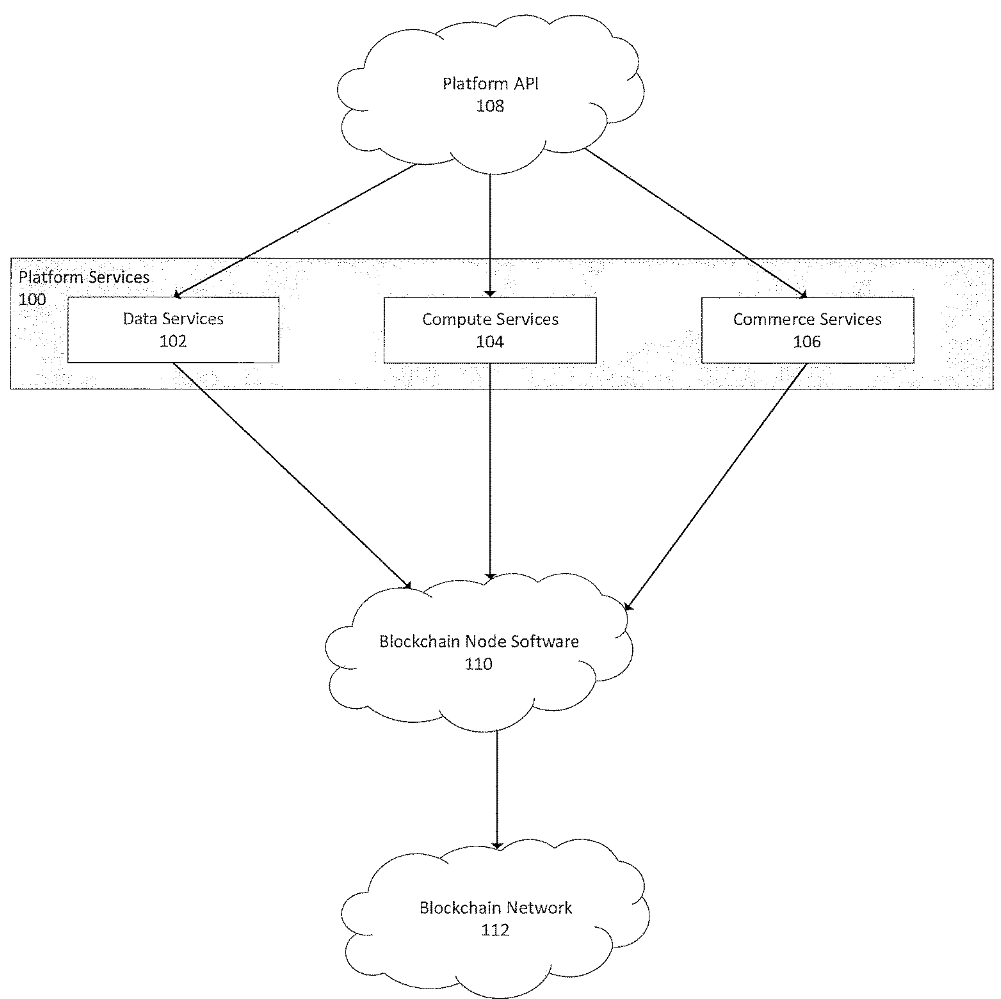
FIG. 1 is a schematic diagram, depicting an overview of a platform for a plurality of services associated with a blockchain, according to a first aspect.

While the appended claims are in relation to the fourth aspect of the present disclosure described in detail below, a detailed discussion in detailed to the first, second and third aspects are provided herein to provide a reader with a full and complete understanding of the claimed aspects and related embodiments of the present disclosure.

In accordance with a first aspect, the present disclosure provides a computer implemented method for providing a platform of a plurality of services that are associated with a blockchain, the platform being provided for a plurality of clients, the method implemented by a platform processor associated with an application programming interface (API).

Advantageously, the platform processor API allows for web-based interaction interface, i.e. it may in some embodiments be implemented as a web service for the one or more clients, such that communication may take place over the Internet using standard Internet communication protocols for web-based services. For instance, in some embodiments, whereby HTTP messages or requests in an application level, or layer between a client and a server (the platform service in this case), such as HTTP, HTTPS etc. may be transmitted and received based on transport layer protocols, such as TCP/IP etc. The reference to HTTP transmission protocols, or HTTP API, herein also encapsulates all standard Internet communication protocols, such as TCP/IP, UDP, HTTPS, etc.

In some embodiments the platform processor is implemented as an HTTP API endpoint. In some embodiments the platform processor is implemented as a Representational State Transfer (REST) endpoint. Advantageously, the API may be implemented as a REST endpoint, thereby also allowing the client to communicate using standard Internet or web-based protocols, such as HTTP or HTTPS.

The method of the first aspect comprises the steps of receiving a request from a given client among the plurality of clients, the request pertaining to a given service among the plurality of services, and from the given client being based on a Hypertext Transfer Protocol (HTTP) transmission protocol format. Then, based on a determination that the client identity and/or request(s) is/are valid, the method includes obtaining a destination address associated with the given service. In some embodiments, the destination address may be an IP address or a network address endpoint. For example, this may be an endpoint universal resource identifier (URI) and may include the universal resource location (URL) of a web server, from where the requested service may be accessed by the payment processor or one or more other entities (including the client) for the requested service.

In some embodiments, this destination address may be the same endpoint as the platform API endpoint. This may be the case if the platform offers such a requested service as that of a main or core service. In other embodiments, where there are multiple different types of services offered by the platform, each implemented by different processors or webservers, then the destination address may be different to the platform API, which may act as a host server for other processor and webservers that are associated with the platform. In this case, a platform processor comprises or is associated with a plurality of processors, each configured for implementing a given service among the plurality of services on the blockchain, and each being associated with a specific destination address or endpoint that is unique to the respective processor.

The method of the first aspect further includes the step of processing the request for the given service, based on at least one blockchain transaction corresponding to the obtained destination address to obtain an output script. In some embodiments, the output script is associated with data relating to the requested service, or the result of the service requested is included in a UTXO and includes such data or digital asset for the transaction. In the first aspect, this result associated with the output script is then sent to the given (requesting) client in the HTTP or similar transmission protocol format.

Advantageously, the method of the first aspect of the present disclosure, by implementing a platform that is provided as an API for one or more clients, allows one or more processor associated with a client to sign-up, or use a web service provided by the platform processor to write or access data into a blockchain. The one or more processors associated with the platform can implement one or more of the services being offered, using a standards-based interface design, such as, but not limited to, the REST (Representational State Transfer)—which is an architectural style for developing web services and web-based interactions. A resource, in the context of REST API, can be defined as an object with a type, associated data, relationships to other resources, and a set of methods that operate on it. Thus, the platform or services implemented by the platform processor of the first aspect is advantageously provided as an API implementation, to access the (state of a) blockchain or distributed ledger, such as the Bitcoin SV (BSV) blockchain, and to trigger operations or functions that can alter that state, via an application interface, and expose it as a REST API. In other words, one or more servers or processors associated with the platform may be considered as a REST endpoint for one or more clients that choose to use such service. Advantageously, the client can thus communicate with the platform service via HTTP or similar Internet commands. More advantageously, no BSV, Bitcoin, blockchain knowledge, ECDSA, or other cryptographic key-management libraries, or transaction construction software, such as digital wallet software etc., needs to be implemented by the client for any of the services offered. The client using one or more processing resources or user terminals can simply register to use the platform via some known authentication techniques, such as password protection authorisation or standard public key infrastructure (PKI) for verifying client identify. The client should then simply be able to communicate with the platform service via basic HTTP or similar.

In some embodiments, some examples of the services associated with the blockchain that can be provided via the platform are:

- data services, for writing/submitting data into the blockchain to alter a state of the blockchain;
- data services, for reading/obtaining data reflecting the current state of the blockchain;
- services associated with simplified payment verification, for transactions associated with the blockchain;
- services associated with the management of one or more event streams and/or machine-readable contracts associated with the blockchain;
- services associated with the management of a digital wallet framework, for a plurality of clients.

In the embodiments, where there are multiple processors or webservers associated with the platform processor of the first aspect, the method of the first aspect further comprises the step of providing an application programming interface (API) converter, for performing the steps of: receiving the request from the client in the HTTP transmission protocol format, converting a received request to a Remote Procedure Call (RPC) format, and sending the RPC request to a given processor among the plurality of processors, that is configured to implement the service identified in the received request. In a reverse flow path this embodiment includes receiving a response associated from the given processor in an RPC format, and converting the respective response to be sent to the client using the HTTP, or a similar transmission protocol.

This is advantageous as it allows the client to communicate requests that are associated with the blockchain via simple HTTP, using a web-based platform API, and seamlessly providing interoperability with any of the nodes or servers that implement the above described services, but that do not communicate using Internet protocol communication standards for web services. The API convertor implemented in this embodiment is not limited to HTTPS to RPC and vice versa conversion, or for that matter other web-based protocols to alternative communication protocols that are supported by the platform processors implementing one or more of the above services, networks for a given cryptocurrency, or digital assets that can otherwise be envisaged. In the reverse flow path, the method of the first aspect also includes receiving responses associated with the corresponding blockchain transaction from a respective processor in an RPC format, and accordingly, converting the respective responses using HTTP for sending on to the client. Thus, advantageously implementing the proposed interface by the platform processor enables seamless communication, for submitting transactions to the blockchain when the clients (payees) and miners use different wireless data communication protocols and mechanisms.

In some embodiments of the first aspect, the received request from the client is an HTTP GET or HTTP POST or HTTP PUT or HTTP PATCH request that includes or is associated with a client identifier, specific to a given client, as well as a service identifier for the given service requested among the plurality of services that are offered by the platform, as mentioned above. In some embodiments, the result sent to the client is an HTTP POST request based on the client identifier.

In some embodiments, to make client addressing for blockchain transactions simpler, there already exist mechanisms where a memorable and more user-friendly alias is used instead of the complicated public address for one or more client entities. Such a solution is proposed in U.S. patent application Ser. No. 16/384,696 and UK patent application number 1907180.2, both in the name of nChain Holdings Limited. These documents set out an alias-based payment service and associated protocols, referred to as bsvalias payment service, where an alias is used for destination addressing instead of the public address of a client entity. The alias in such a system is usually associated with a domain name of a sending/receiving client entity and may be a URI or an email address. Thus, as long as a sender or entity is aware of, or is provided with the alias, this is sufficient for the bsvalias payment system or an alias based addressing mechanism. Messages may be sent to the alias of a client, for instance, using instructions provided in a machine-readable resource, such as a JavaScript Object Notation JSON document, saved in a well-known URI or location for the bsvalias or other payment service. In some embodiments of the present disclosure, one or more of the plurality of clients may have an alias such as the above to identify the respective client.

In related embodiments, the method of the first aspect comprises validating the client based on the client identifier and a record corresponding to the client identifier, the record associated with the platform processor. For example, such record may have been created and stored in or associated with the platform processor at the time of client sign-up or registration. Then, based on a successful validation of the client, the method includes determining if the received request from the client is valid, based on the service identifier and an attribute or setting included in the respective record. In some embodiments, said attribute or setting may indicate whether or not a given client is allowed access to all or part of the requested service. For instance, one or more levels of permission associated with the client identifier may be provided in the attribute or setting. For example, a given client may be allowed to request services to read data that is on a blockchain for a specific event, but may not be allowed to modify, delete or terminate such event, whereas another client may have permission for all action pertaining to one or more services.

In some embodiments, the step of verifying the identity of a given client may be based on a digital signature associated with the client. Cryptographic key pairs, including a private key and a public key (or public address) associated with each client, may be used for verifying that a request made for a service did indeed originate from the given client, i.e. where data signed by a private key can only be recovered or validated using the corresponding public key. Standard public key infrastructure (PKI) techniques may be used and implemented if verification is based on a digital signature.

In some embodiments of the first aspect, a computer implemented method for accessing the platform of a plurality of services, as implemented by one or more processors of a given client among the plurality of clients, comprising the steps of obtaining or identifying an application programming interface (API) endpoint associated with one or more processors, associated with the platform, and sending a request pertaining to a given service among the plurality of services, the request including or associated with a client identifier for the given client, and a service identifier for the given service requested. As mentioned above, the request is sent using a Hypertext Transfer Protocol (HTTP) or similar transmission protocol format. The method also includes receiving a result pertaining to an output script of a blockchain transaction associated with the request, said result being provided to the client in the HTTP transmission protocol format.

In a second aspect, the present disclosure provides a computer-implemented method for implementing a data-writing service, for transactions associated with a blockchain, the method being implemented by a platform processor associated with an application programming interface (API), to enable clients to access the service to write data into a blockchain. The method of the second aspect comprises the steps of receiving a request from a client, the request relating to an event stream ES implemented using the blockchain, the request from the client being based on a Hypertext Transfer Protocol (HTTP) transmission protocol format. In some embodiments, the event stream may track or represent as a Finite State Machine (FSM), such as a Deterministic Finite Automaton (DFA), which is a well-known computing term, representing a system having a finite number of states, and which may be in only one state at a given time, with a transition function or a trigger event for transitioning from one stage to the next. In some embodiments such event stream is useful to represent a control means or technique of a technical process. In some embodiments, the event stream may represent or track the inputs, states and/or events associated with a machine-readable contract or smart contract on the blockchain, where, advantageously, an immutable record of the past and current state of the contract is recorded. In some embodiments, the request received from the client includes a trigger event, to enable a state transition to take place in a smart contract associated with the event stream.

The method of the second aspect comprises the step of determining a current state of the event Stream $ES_{i=n}$, wherein i is an integer from 0 to N, each integer i representing a given state of the event stream ES, whereby i=0 represents the created event stream ES, i=n represents the event stream ES in a current state in the blockchain, and i=N represents a final state of the event stream ES. In some embodiments, the determination of the current state may an indication of the present state based on a most recent result associated with the event stream, said result stored on the blockchain or in one or more separate off-chain storage resources for event stream. This may be based on an identifier of an earlier or pervious blockchain transaction associated with the event stream. If there is no previous state identified for the event stream then this will result in a determination that the current state is n=0, i.e. a new event stream is to be created. In some embodiments, the current state may also be retrieved or read from the blockchain. This may be performed by a data reader as explained above, which may be a service among the plurality of services provided by the platform processor.

In the method of the second aspect, processing a new event $E_{n+1}$ for the event stream ES, based on the received request, includes the step of creating a blockchain transaction $TX_{n+1}$, the blockchain transaction including an input associated with a transaction output ($TXO_n$) from a previous transaction $TX_{n+1}$ and an unspent output ($UTXO_{n+1}$), associated with event data representing the new event $E_n$. In some embodiments, where n=0, no input that spends a previous output will exist. There may however be other inputs that represent digital assets associated with the event stream ES. The method then includes submitting the transaction $TX_{n+1}$ to the blockchain.

Once submitted, the current state of the event stream is updated to be based on the submitted blockchain transaction, i.e. the state will be updated to be based on the newly created event $E_{n+1}$, such that $ES_{i=n}=ES_{n+1}$. In some embodiments, the updated state is based on data present in $UTXO_{n+1}$, the unspent output of the latest transaction in the event stream. The method then includes sending a result, based on the updated currented state of the event stream $ES_{n+1}$, the result being provided based on the HTTP transmission protocol format.

The second aspect of the present disclosure discusses the implementation of a data-writing service implemented by a platform processor, or in other words, the implementation enables the functionality of writing data associated with a real world process, such as controlling the states of a smart contract. The platform processor of the second aspect is associated to that discussed in the first aspect, wherein the second aspect discusses one of a plurality of blockchain services, i.e. for writing data into the blockchain to change its current state. As the request and the respect is received and provided using an API for the platform, the second aspect provides all the advantages associated with the first aspect. In addition, the data-writing service advantageously allows one or more clients to enable a transaction of state of a blockchain-implemented smart contract, by simply extracting the triggers or events from the effect. Thus, an immutable record of the various stages of the smart contract may be provided by the data writing service of the second aspect.

The third aspect of the present disclosure is related to the data-writing service of the second aspect, as discussed above for service provided in relation to event streams. In this aspect, a technique for establish a tamper-proof record or log, or a certificate confirming the sequential occurrence of events associated with an event stream. Thus, in the third aspect the method of the present disclosure proposes methods, devices, and systems for providing a creating, updating and/or terminating event stream, that is implemented using the blockchain and automatically creates a tamper-proof log or record of events associated with the event chain.

In the third aspect, the present disclosure provides a computer—implemented method for implementing a data-writing service, for transactions associated with a blockchain, the method being implemented by a platform processor associated with an application programming interface (API), to enable clients to access the service to write data into a blockchain. The method of the third aspect comprises the steps of receiving a request from a client, the request relating to an event stream ES on the blockchain, the request from the client being based on a Hypertext Transfer Protocol (HTTP) transmission protocol format.

An event $E_n$ for the event stream ES is then identified in the received request from a client. For the event stream ES, n represents the current length of the event stream ES. If n=0, so that $E_n$ is the first event to create the event stream ES, then a first blockchain transaction is created for the event stream ES, including a first unspent output that is a dust output. Blockchain transaction dust or simply "dust" in the context of blockchain transaction for the present disclosure is understood to be a spendable transaction for a digital asset or cryptocurrency that has an output of low or minuscule value, i.e. the value may be much less than fees for mining the output in the blockchain. This dust output may be a minimum value of cryptocurrency or digital asset output that can be spent. In some embodiments, the digital asset or crypto current funds associated with such dust transactions, i.e. those handling the transfer of minimum value of a digital asset in its output, may be provided or managed by the platform processor. In other words, the dust output referred to in the present disclosure for the blockchain transaction is associated with a digital asset having a value that is below a value limit for a transaction", i.e. perhaps the value of the dust output is lower than for instance the mining fee that may be required to spend such transaction.

If 0<n<N, where N is the final or maximum value for n, so that $E_n$ is an event to amend the event stream ES, then a current blockchain transaction is created including a first input spending a dust output, associated with a previous transaction for the same event stream; a first unspent transaction output being a dust output for the current transaction, and a final unspent transaction output being associated with event data, representing the current event $E_n$. In some embodiments, the event data is included in a data carrier element. This may be an un-spendable OP-RETURN output of the transaction. In some embodiments, the event data for the event $E_n$ in the final unspent transaction output for the current blockchain transaction includes a hash of the event data. This advantageously keeps the event data contents of the event stream ES private. In some embodiments, a salt, which is a unique value that may be randomly generated by the platform processor for each transaction associated with an event stream, may also be included. In some embodiments, the hash of said event data is applied by the platform processor, thereby advantageously allowing the platform service or processors to hold such event data privately. In other embodiments, the hash of said event data is applied by the client device prior to being included in the request that is received by the platform processor. This advantageously enables the client to hold the event or data associated with the event in the request privately, not even sharing it with the platform. In other embodiments, the event data for the event En in the final unspent transaction output includes raw event data, which is public on the blockchain, once written or submitted to it.

If n=N, so that $E_n$ is an event to terminate the event stream ES, then a blockchain transaction is created including a first input, spending a dust output associated with a previous transaction for the event stream; a first unspent transaction output associated with a digital asset that is above a defined dust output limit, i.e. above the defined or minimum value of digital asset or cryptocurrency. Advantageously, the absence of a dust output signifies the termination of the event stream in this case, as this represents that there is nothing more in the event stream to track, i.e. no more events in the sequence. The provision that the first output being above the dust limit is to signal the end of the chain. Further, the final blockchain transaction does not have any event data output, i.e. there is no data carrier element present, which advantageously signals that this is not a data event to alter the event stream, but to terminate it.

In either of the three cases for n discussed above, the transaction is submitted to the blockchain and a result associated with the transaction is provided based on the HTTP transmission protocol format. In some embodiments, the event associated with the request, i.e. either $E_0$, $E_n$ or $E_N$, may be a single event or two or more events, relating to the respective request. For example, the request may include a data set of two or more sub-events for each $E_0$, $E_n$ or $E_N$. In some embodiments, the result is based on the event data output of the transaction or the event associated with the respective transaction. In some embodiments, any result or event data that is returned may be held in an un-spendable OP_RETURN output of the transaction. This is a Script opcode which can be used to write arbitrary data on blockchain and also to mark a transaction output as invalid. As another example, OP_RETURN is an opcode of the Script language for creating an unspendable output of a transaction that can store data and/or metadata within the transaction, and thereby record the metadata immutably in the blockchain. Metadata could comprise a log or time entry or a document which is desired to be stored in the blockchain. The event data or result may in some embodiments be considered to be a payload comprised in the unspendable output of the respective transaction. Such an output may be made unspendable by means of an opcode that terminates the locking script of that output, e.g. OP_RETURN mentioned above. However in other embodiments, the payload or event data may be included in other ways.

The use of dust outputs in the transaction is advantageous and key for maintaining an immutable sequential record of all transactions as they occur for an event stream ES. This is because, although by posting transactions to the blockchain all blockchain transactions would be time-stamped and remain in order in the blockchain, this does not guarantee preservation of their sequential order. This is because transactions might be mined into blocks at different times. Therefore, only the ordering of the blocks in the chain follows chronologically in a blockchain, and not individual transactions. Whereas, to track, record, and audit the exact sequential order of events for an event stream that may be a smart contract, advantageously, the use of dust outputs that must be spent by the first input of the next transaction in the sequence ensures that the order of the transaction is chronologically tracked and a tamper-proof record is created. This is because once mined into a block, the payment of dust from a previous transaction to a next one in the sequence ensures that, in alignment with Bitcoin protocol rules, the sequence of embedded data carrier elements (which are the final outputs in each transaction) cannot be reordered, and no insertions or deletions may occur, which could change it without it being immediately obvious that the event stream has been compromised. In some embodiments, a double spend prevention inherent to the Bitcoin protocol ensures that the movement of cryptocurrency (e.g. dust) between different addresses, and therefore associated events, remains in chronological order. Thus, this improves the security of smart contracts on the blockchain as well as the log, a copy or a replication of the series of event occurrences.

In some embodiments, a hierarchical deterministic key chain K, to be used for a request associated with the event stream ES, is determined. Such key chain is unique to the given event stream. The cryptographic private/public key pairs, from the seed or parent, or master key pair K, may then be derived for each event associated, such that $K=K_{n=0\ to\ N}$, where n is an integer from 0 to N, each integer n representing a current length or current number of events associated with the event stream ES, where N represents a maximum or final value of n. This advantageously ensures that the keys derived for a particular event stream are related to a common master or seed key and can be derived for processing each respective event. This way, advantageously, a locking script associated with the dust outputs are secured with a derived key $K_n$ for the current event, and the first inputs each spend the dust outputs from the previous transactions, using the previous key pair $K_{n-1}$ This ensures that the outputs can only be spent with a corresponding key pair, specific to the respective previous transactions.

In some embodiments, the result associated with the event stream ES includes a certificate confirming at least one of the following:

- a transaction identifier within which the event $E_n$ was submitted to the blockchain
- a Merkle inclusion proof of the transaction to a header in the blockchain
- a copy of the block header in which said transaction was included In some embodiments, each of the transactions created, as discussed above for the third aspect, may further comprise other inputs associated with a digital asset. This may be provided based on an operational float, manged by the platform processor. In some embodiments, this may be associated with a digital asset or cryptocurrency resource or fund maintained or controlled by the payment processor to cover transacting mining fees and one or more other operations for the blockchain etc. The transactions may also have one or more change outputs associated with the digital asset. As mentioned above, the final transaction has all change outputs.

In some embodiments, the event stream ES may be identified based on a transaction identifier associated with the submitted blockchain transaction. In some embodiments, a state associated with the event stream ES may also be identified based on a transaction identifier associated with the most recently submitted blockchain transaction.

In some embodiments, the method includes storing a copy of a record, or a log that is based on the result(s) for each event of the event stream ES, in an off-chain storage resource. This storage resource may be associated with the platform processor, or in a different device, database, or service from which it may be requested or retrieved when requested by a client. Advantageously, storage of the log associated with the results of the event stream are stored separately, to avoid a requirement to download an entire blockchain and sift through the data for any queries associated with the event stream. The blockchain itself implementing the event stream, could be checked in circumstances during audits or data verification. The back-up or separate copy could then be used for quick queries.

In a fourth aspect, the present disclosure provides a computer—implemented method for synchronising a plurality of event streams associated with a blockchain, the method being implemented by a platform processor associated with an application programming interface (API). The method of the fourth aspect is related to the method of appending or modifying a single event stream, as set out above in the third aspect. However, the fourth aspect is related to a technique for synchronising a plurality of separate and independently progressing event streams based on a single or common event using a single blockchain transaction, referred to as an atomic transaction or a rendezvous transaction across the plurality of event streams. This API for the platform service for implementing the fourth aspect may be the same API referred above for the third aspect, or may be a separate and specific API associated for the platform processor for synchronising event streams.

The method of the fourth aspect comprises the steps of receiving a request from a client, the request relating to a plurality of M event streams on the blockchain. In some embodiments, the request from the client is based on a Hypertext Transfer Protocol (HTTP) transmission protocol format. The request from the client is to update a plurality of existing event streams $ES_{n=1\ to\ M}$ associated with the blockchain, n being an integer from 1 to M, where $M \geq 2$. The method also includes obtaining a current event $E_n$ to be appended to each event stream $ES_n$ among the plurality M of event streams $ES_{n=1\ to\ M}$.

As mentioned above, the client may be a processor, a computing resource, a software application or program, or another entity that can access an event stream or is authorised to access a resource tracked by the event stream. In some embodiments, for a synchronisation request according to the fourth aspect, a smart contract that acts as an agent or coordinator on behalf of the participating plurality of M event streams $ES_{n=1\ to\ M}$ may also be considered as the client making the synchronisation request.

The request from the client may be received at the API as a JSON object that includes an identifier for each of the plurality of event streams $ES_{n=1\ to\ M}$, i.e. M event stream identifiers will be included in the JSON object representing the request. In most cases the identifiers are received form the client as part of the request. In some cases, the API may obtain the plurality of M event stream identifiers from an account or record associated with the client.

In some embodiments, the request from the client may also specify a target index for one or more of the identified event stream $ES_n$, the target index being the index of the respective event stream $ES_n$ at to be used for the synchronisation request, i.e. the target index represents the next available position in a given event stream at which the current event $E_n$ is to be appended.

In some embodiments, the target index is equivalent to a sequence number of the respective event stream $ES_n$, and identifies the point in the event stream $ES_n$ to be used for the synchronisation request. In most cases the target indices are received from the client as part of the request. In some cases, the API may obtain the respective indices automatically or directly from the event stream $ES_n$ or from an external log associated with the event stream $ES_n$.

In some embodiments, similar to the third aspect, a hierarchical deterministic key chain be used for each event stream $ES_n$ is determined. Such key chain is unique to a given event stream among the plurality of M event streams $ES_{n=1\ to\ M}$.

In some embodiments, verification checks, such as also as mentioned above for the third aspect, are carried out for each event stream $ES_n$ based on its respective key chain K or a public key. In some embodiments, the method may also include a verification step to check if a next available index value for each event stream $ES_n$ among the plurality of event streams $ES_{n=1\ to\ M}$ is the same as the target index for the respective event stream $ES_n$ that is specified in the request. In some embodiments, there is a possibility that a subset of event streams among the plurality of M event streams $ES_{n=1\ to\ M}$ will have a target index value specified, and others will not. In this case, for the subset alone the target index will be checked, whereas for the others, any next available index used cannot cause a failure.

For example, let us consider two accounts X and Y where funds are being subtracted from one X and added to the other Y, i.e. transferred from X to Y. The present embodiment may be used to implement a logical clock to synchronise both accounts, so that it may be possible to verify the state of each of the accounts involved in the transfer. For the account X that is being subtracted from, once the subtraction event from X has been added to the event streams associated with both X and Y, the next available transaction index for X is provided or recorded. This next available transaction index for X should not change until the transfer to Y is completed for it to be true or valid, i.e. the next event in the event stream associated with account X should be the addition of the funds to account Y, and this next available index should match with a specified target index for X in the request from the client, if one is provided, in order to be successful. If the target index is provided, then this can then be verified based on the next available index value to be used for transactions in the event stream for X after the subtraction event. Whereas, for account Y, i.e. the one being added to, the transaction index for Y after the subtraction event has been recorded in the event stream for Y, is free to increase without limitation. For instance, there may be other funds being paid in to account Y after the subtraction event from X thereby resulting in further transactions in the event stream for Y soon after the subtraction event. This can be allowed and may be left unchecked as it does not affect the transfer or balance needed for the transfer from X to Y. Therefore, the index values for transactions in the event stream associated with Y may not need to be verified and therefore may not be provided for this purpose.

The request in relation to appending the current event $E_n$ to each respective event stream $ES_n$ to synchronise the multiple events streams will then be progressed if the one or more verification checks are successful for all event streams $ES_{n=1\ to\ M}$ in the plurality. Otherwise, the method includes generating an error notification and sending this to the client. Then, for each event stream $ES_n$ among the plurality, the method includes identifying a previous blockchain transaction $TX_{n-1}$ associated with the respective event stream $ES_n$.

The method then includes creating an atomic blockchain transaction $TX_n$ for the current event $E_n$ to be appended to each event stream $ES_n$ among the plurality of M event streams $ES_{n=1\ to\ M}$ in order to synchronise the plurality.

In some embodiments, event data associated with the current event $E_n$ for synchronising the plurality of M event streams is the same for each of the plurality of M event streams. For example, this may be the case where funds or digital assets using the same exchange rate, or the same currency is to be added or removed from all event streams. In other embodiments, the event data associated with current event $E_n$ may be different for one or more of the plurality of M event streams. For example, one or more of the M event streams may be applying a different exchange rate to the rest or may be using a different type of token or digital asset or cryptocurrency for the current event $E_n$. In some cases, there may not even be any event data that is associated with the current event $E_n$ used for the synchronisation. In this case, the event $E_n$ may just be associated with metadata. The metadata may be associated with a time or date or any other parameter that can be used to verify that for the plurality of M event streams, a given event was added or performed at a given time, with either the same or different data or no data at all. Thus, the synchronising event $E_n$ may be a logical timer to ensure that either the same event or indeed different events are appended via atomic blockchain transaction, giving the plurality of M event streams synchronisation at a given point in time.

The atomic blockchain transaction $TX_n$ is also referred to as a rendezvous transaction and comprises:

- n=M inputs, each $n^{th}$ input spending a dust output associated with the previous transaction $TX_{n-1}$ of the respective event stream $ES_n$.
- for each of the n inputs, a respective unspent transaction output ($UTXO_{n\_dust}$) being an $n^{th}$ dust output for the atomic transaction $TX_n$ associated with the respective event stream $ES_n$, and
- an unspent transaction output ($UTXO_{n\_data}$) associated with event data representing the current event $E_n$.

The use and advantages of a dust input and output are already mentioned in the third aspect. In all event streams discussed in the present disclosure, tracking the dust inputs/outputs, i.e. the chain-of-dust, transactions is used to prevent reordering of entries in the log after-the-fact of insertion/deletion. As with the third aspect, the event $E_n$ is a data carrier payload for the atomic transaction including an un-spendable OP-RETURN output of the transaction. In some cases, there may be a separate or additional output per input to include or store data associated with the state of a respective stream, in addition to the event data $E_n$. Each of the inputs/outputs can also be secured with a respective key for the event stream, as mentioned above.

However, the atomic transaction of the fourth aspect allows many dust chains, each relating to a different event stream, to pass through a single blockchain transaction. To ensure traceability for each respective event stream in the atomic transaction, each $n^{th}$ dust input/output pair for a given event stream $ES_n$ among the plurality of event streams $ES_{n=1\ to\ M}$ is associated with its corresponding index value in the atomic blockchain transaction.

Advantageously, whatever the state or progress of each of the plurality of event streams $ES_{n=1\ to\ M}$, the fourth aspect provides a mechanism whereby a common event $E_n$ or data payload associated with the common event $E_n$ can be appended to each of the plurality of event streams in a single blockchain transaction. This is advantageous for applications where it is useful to apply a given event or update across multiple resources or entities, and then be able to verify that this that the data was consistent across each of these multiple resources. This is possible in embodiments where the participating events streams are associated or owned by a given client or account. In some cases, one or more of multiple events streams are owned by different entities. For instance, the client may be associated with a smart contract used to initiate synchronisation where the rules of that contract dictate that all input must be the same. In this case, a verifying entity may infer that all other streams contain the same event or data as the stream that is being checked, even if all streams are not owned or cannot be accessed by the client. An example would be to ensure that a debit and/or credit entry associated with an asset for multiple banking accounts reflects the same information, at the same point in time, and can be verified using the same transaction for all accounts concerned. Another example would be if a global change is to be applied to all clients or accounts associated with smart contract, where multiple parties agree to use a new exchange rate, where each account is maintained by a separate event stream respective to a given party.

In some embodiments, where it is desired or useful to track the state associated with one or more event streams among the plurality M of such streams that are being synchronised, the method includes mapping an input of the atomic blockchain transaction to a respective output associated with a given event stream based on a given pattern, which may be regular or arbitrary. The input, in such embodiments, is the input associated with spending the dust from a previous transaction of the nth event stream, and is also referred to as a dust input. The output referred to may be the dust output or another output associated with a data carrier or OP_RETURN for the given transaction that is associated with the respective (nth) event stream. The use of a pattern linking the inputs and outputs of the transaction that is associated with an event stream $ES_n$ helps to track a state of the respective event stream $ES_n$.

For an example of a regular pattern, when x is an index associated with an nth input for the respective stream $ES_n$, the pattern provides mapping the dust of the nth input at an index x with an output stored at index 2x. The state of a respective event stream $ES_n$ participating in the synchronisation can then be obtained based on an output stored at index 2x+1. As with blockchain transactions, the input indices x will run from 0 to M−1 for the atomic blockchain transaction.

Advantageously, by using a regular pattern to link the inputs/outputs of an atomic transaction, an auditor or verifying entity will then know where to locate an output and state of a given event stream $ES_n$, if the index of its input is available. This input index may be provided by the platform processor, or may be obtained by scanning all inputs to a given event stream.

Other arbitrary patterns may also be possible, provided that the input index and/or the corresponding transaction identifier TxID associated with the blockchain is provided to the client and/or a verifying entity.

In some embodiments, each event stream $ES_n$ associated with the request from the client may be locked or kept in a state that cannot be accessed or changed by any other request or entity, until the current event $E_n$ has been appended to the plurality of M event streams $ES_{n=1\ to\ M}$, or until an error message is generated for one or more of the event streams in said plurality. This advantageously ensures that when synchronisation takes place, it is the known and expected previous state of each event stream that is being updated, and that there have been no changes since the synchronisation request was sent from the client.

In some embodiments, for the multiple event streams associated with the request from the client, compliance with a time window that may be optionally specified in the request can be checked. An error message may be generated if the time when the request is processed falls outside of the time window.

The method then includes in some embodiments, responsive to appending the current event $E_n$ to each of the plurality of M event streams $ES_{n=1\ to\ M}$, obtaining the next available index value for each of the event streams ES. This is then provided as a response array of the obtained next index values for the plurality M of event streams. This advantageously provides confirmation that the plurality of M event streams have been updated and synchronised. It also provides the new or current index value for each of these streams so that future requests can be made for each individual stream event, after the atomic blockchain transaction. In some embodiments, the returned index value is advantageous if the synchronisation request fails, the unexpected index may be used to indicate the need to re-synchronise with the other data in the respective event stream. In some embodiments, such re-synchronisation may be required before a failed request can be retried by the client.

In some cases, the response array may be stored separately or externally, so that it can be accessed by other authorised entities.

In some embodiments, the dust input index for each of the n=M inputs of the atomic blockchain transaction is recorded in the respective event stream $ES_n$ associated with the $n^{th}$ input. This is advantageous, as the dust input index can be used to derive the other indices for a given event stream among the plurality of $ES_{n=1\ to\ M}$, such as the dust output index and/or the event data index. In some embodiments, all indices of the atomic blockchain transaction is recorded in the respective event stream $ES_n$ associated with the $n^{th}$ input.

Once appended to the event stream, the method includes sending a result associated with each of the plurality of synchronised event streams $ES_{n=1\ to\ M}$ to the client. The response array may also be sent as part of this result. In some embodiments, the result is returned further to an approval of an event stream or submission of the atomic blockchain transaction $TX_n$ to the blockchain.

In some embodiments of the third and fourth aspects, a computer implemented method for accessing a service for writing data associated with an event stream is provided, implemented by one or more processors of a given client among the plurality of clients. The method comprises the steps of obtaining or identifying an application programming interface (API) endpoint associated with one or more processors of the platform, sending a request pertaining to a data-writing service, and then sending a request for one or more events $E_n$ pertaining to an event stream. For the fourth aspect, the request includes a request for synchronising of a plurality of M event streams in a blockchain, where M≥2, with an event $E_n$. As mentioned above, a request is sent using a Hypertext Transfer Protocol (HTTP) transmission protocol format. The method also includes receiving a result pertaining to the requested event $E_n$, said result being received based on the HTTP transmission protocol format. In some embodiments, the method includes applying a hash function to the event data associated with the event $E_n$ being requested, such that the request includes the hashed event data for the event $E_n$, instead of the raw data.

In the fourth aspect, where the request is for synchronising M event streams to append a common event $E_n$, the method includes providing the identifiers for each of the plurality of M event streams in the request. In some cases, a target index value, where available, for one or more of the plurality of M event streams to be used for appending the event $E_n$ in each respective events stream is also included.

Aspects of the present disclosure also include a computing device comprising a processor and memory, the memory including executable instructions that, as a result of execution by the processor, causes the device to perform the computer-implemented method, as discussed above, where the computing device pertains to the platform processor.

Aspects of the present disclosure also include a computing device comprising a processor and memory, the memory including executable instructions that, as a result of execution by the processor, causes the device to perform the computer-implemented method, as discussed above, where the computing device pertains to client.

Aspects of the present disclosure also include a computer system comprising at least one platform processor communicatively coupled to at least one client via a wireless communication network, the at least one platform processor associated with an application programming interface (API) endpoint for processing HTTP requests from the at least one client, the at least one platform processor implemented in accordance with the computing device mentioned above; and the at least one client being implemented in accordance with the client computing device mentioned above.

Aspects of the present disclosure also include a computer-readable storage medium having stored thereon executable instructions that, as a result of being executed by a processor of a computer, cause the computer to perform the method of any of the aspects and embodiments set out above.

Some specific embodiments are now described by way of illustration with reference to the accompanying drawings, in which like reference numerals refer to like features.

First Aspect—Platform API for a Plurality of Services Associated with a Blockchain The platform processor for providing a plurality of services described above for the first aspect may be Platform as a Service (PaaS) and Software as a service (SaaS) offering that advantageously enables rapid delivery of useful real-world business and technical applications, such as management of software controlled technical systems or smart contracts, using a blockchain network such as the BSV blockchain. An overview of the platform services can be seen in FIG. 1 that shows a high-level schematic of the system. The platform services has a platform processor 100 that provides an API 108, via which the services may be accessed by one or more clients.

Platform Services 100 as shown in this Figure are made up of three families of services and is aimed at allowing users and organisations to easily and securely make use of the advantages offered by the unique properties of a blockchain, without actually implementing any blockchain based software, knowledge or libraries at the client end. These services are:

- Data Services 102 that aim to simplify the usage of the chain as a commodity data ledger.
- Compute Services 104 that aim to provide a generalised compute framework backed by a digital asset such as Bitcoin SV.
- Commerce Services 106 that provide enterprise-class capabilities for transacting using a digital asset such as Bitcoin SV As mentioned above, requests may be received via or using the HTTPS protocol from a client at the API, as the API is implemented as a web service. The requested services are then implemented by the one or more service modules or processing resources 102-106 using underlying software 110, such underlying software 110 being associated with the blockchain, i.e. to implement resources, libraries and/or key-management wallet implementations for creating, processing and submitting transactions associated with the blockchain. Once processed, transactions can be submitted to the blockchain network 112 (instead of the client implementing any such functionality or transaction libraries). At most, the client may or can implement a digital wallet or the like associated with cryptocurrency or some other digital asset, but this is not essential as the platform service 100 may also be able to provide and manage the digital asset for the client.

Figure 2A:
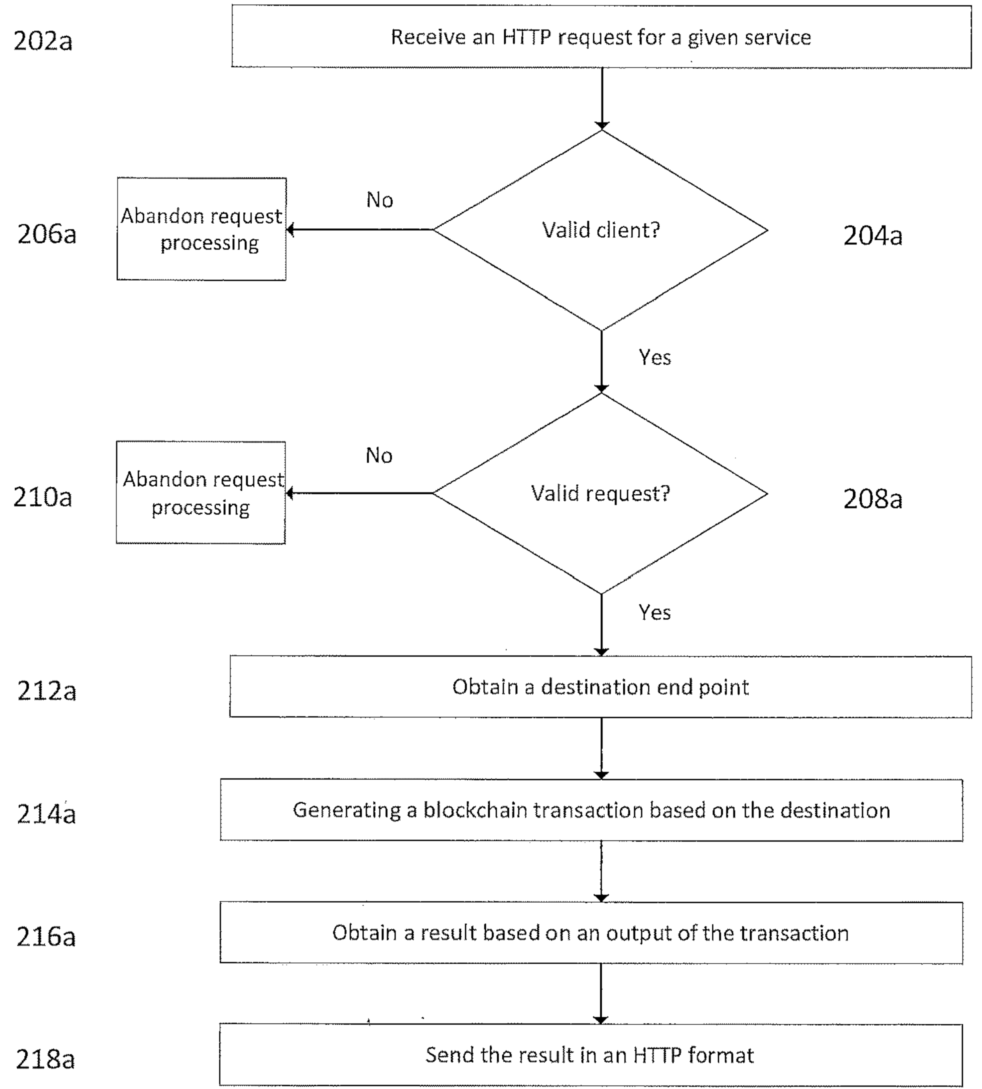
FIG. 2*a* is a flowchart, depicting a method for providing a platform of a plurality of services that are associated with a blockchain, according to the first aspect, as implemented by one or more processors associated with the platform.

FIG. 2*a* relates to the first aspect of the present disclosure and depicts a computer implemented method for providing a platform of a plurality of services that are associated with a blockchain, such as the platform 100 shown in FIG. 1. The method of FIG. 2*a* is implemented by a platform processor associated with an application programming interface (API).

Step 202*a* depicts receiving a request from a given client among the plurality of clients. In some embodiments, the client may be one or more computing devices, resources or processors associated with a client, said client having signed up or registered to access the plurality of services that are provided by the platform processor. As mentioned above, the platform processor may be one or more processors, each offering a different type of function or service to be implemented using a blockchain, such as the Bitcoin SV blockchain (such as a processor for the data, compute and commerce services seen in FIG. 1). It is also possible for there to be just one processor for a single service. As the platform processor is associated with an API endpoint, such as a URI for the platform, the request from the given client can be based on a standard Internet protocol such as the Hypertext Transfer Protocol (HTTP) transmission protocol format. In some embodiments, the request may include an identifier for the client as well as an identifier for the service requested.

In step 204*a* the identity of the client is checked to see if the client is a valid client registered to use the platform processor and the functionality offered by it. In some embodiments, this may be based on known authentication methods such as password protected login authentication or the like. In this case, a record may be created for the given client based on a client identifier or alias included in the request, and a password. Validation may be based on a password received at the API matching the password in the record. In other embodiments, standard PKI techniques based on cryptographic private/public key pairs may also be used to validate a digital signature that is present in the request received form the client in step 202*a*. In this case, the identity of the client can be verified by checking if request signed by the private key can be successfully recovered or validated using the public key.

If the client identity cannot be verified or verification fails, then in step 206*a* the request is not processed any further.

If the client is validated successfully, then in step 208*a*, the validity of the request for the service in step 202*a* is then checked. This step is to ensure that the given client is indeed authorised to avail the service requested. The permission or attributes for this may be present in the record for the client, to indicate one or more types of access levels or service that can be provided or not to a respective client.

If the request is found to be disallowed or invalid for the requesting client, then in step 210*a* the request is not processed any further.

It is to be understood that the embodiments of validating the client and/or service set out above are not essential for the operation of the first aspect, although it is useful. In some cases only the validation in steps 204*a* or 208*a* may be performed. In some cases no validation is performed. In this case, any client, whether registered or not, can use the service or platform upon appropriate payment for such access.

In step 212*a*, a destination address, which may be an endpoint URI for a server or processor that is responsible for implementing the requested service in step 202*a*, is obtained. In some embodiments, where there are a plurality of platform processors, a host server or platform API may covert the received request to a Remote Procedure Call (RPC) format to be sent to the destination address associated with the processor that is configured to implement the service identified.

In step 214*a*, the service requested is processed by the respective platform processor responsible for it. A blockchain transaction is either obtained or read or generated by the platform processor based on destination address/endpoint of the responsible processor, and an output script for this transaction is obtained. While FIG. 2*a* refers to generating a blockchain transaction in this step, it will be understood that the first aspect of the present disclosure is not so limited. If the request in step 202*a* is to read or get data from the blockchain, then a transaction may not be generated, it can simply be read or obtained from the blockchain. There may be a plurality of blockchain transactions or multiple output scripts for one or more of the blockchain transactions generated.

In step 216*a* the output scripts may include data outputs as the result (for instance there may be a data carrier UTXO), or the result may be obtained based on the transaction identifiers or remaining outputs of the transaction. There may also be a non-spendable OP-RETURN output that is associated with the transaction from which the result can be obtained.

In step 218*a*, the result associated with the output script is provided to the given client in a HTTP or similar transmission protocol format. In some embodiments, if the responsible processor for the service is located remotely to the host platform API, then the platform processor receives the response associated with the blockchain transaction(s) from the responsible processor in an RPC format. An API converter then converts this to a message that can be sent based on the HTTP format, before sending it to the client. As mentioned above, if the client used an alias addressing service, such as bsvalias, then the result is sent in a HTTP message addressed to the alias for the client in a format that is dictated by the bsvalias machine readable resource.

Figure 2B:
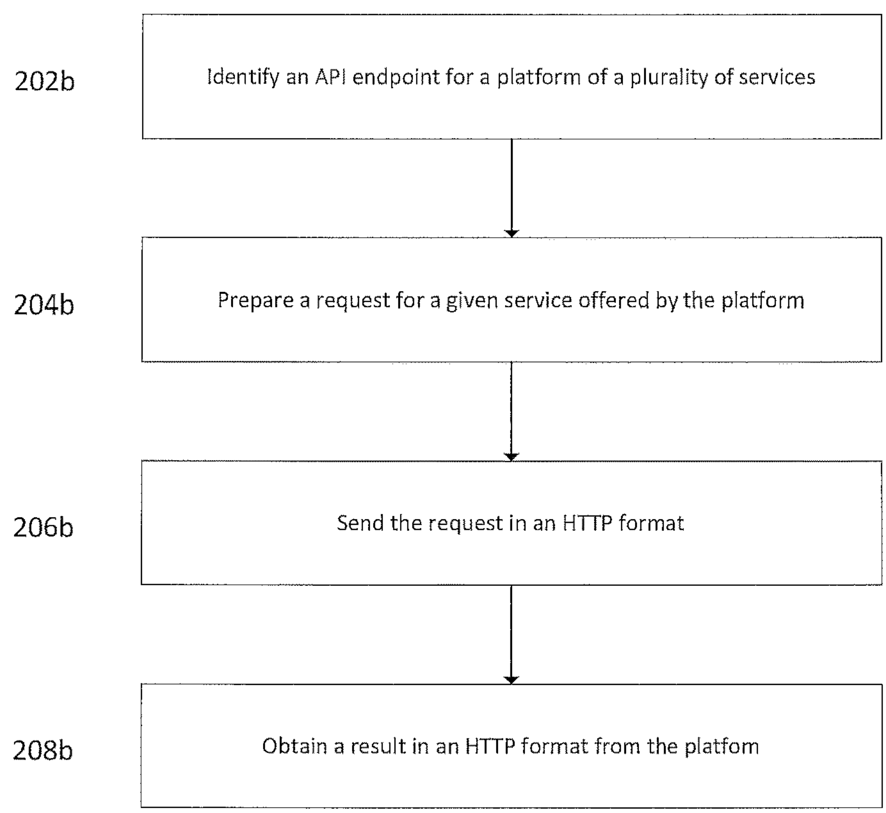
FIG. 2*b* is a flowchart, depicting a method for accessing a platform of a plurality of services that are associated with a blockchain, according to the first aspect, as implemented by one or more processors associated with a client.

FIG. 2*b* relates to the first aspect of the present disclosure and depicts a computer implemented method for accessing a platform of a plurality of services that are associated with a blockchain, such as the platform 100 shown in FIG. 1. The method of FIG. 2*b* is implemented by one or more processors associated with a client.

In step 202*b*, the application programming interface (API) endpoint associated with the platform is identified. As mentioned before, this may be the API associated with a host platform processor, and there may be one or more further processors responsible for implementing the service—each with their own service endpoint or a destination address.

In step 204*b*, the client prepares a request for a service, such as the data writing service 102 in FIG. 1. The client in some embodiment includes a client alias or identifier and/or a service identifier in the request, so that it can be routed to the correct service endpoint. This is useful for checks by the platform processor regarding the validity of the requesting client and the client's permission to use the requested service.

In step 206*b*, the request prepared in step 204*b* is sent using a Hypertext Transfer Protocol (HTTP) or similar transmission protocol format, as the platform processor is implemented as a HTTP or REST API.

In step 208*b*, the result that pertains to an output script of a blockchain transaction associated with the request is provided from the platform processor. This result is provided to the client in the HTTP transmission protocol format.

Advantageously, with the methods of the first aspect, a request for blockchain based services is sent and received by the client in the HTTP transmission protocol format, and therefore the client can make use of all advantages and services unique to a blockchain, without having to implement any transaction capability or blockchain libraries. This is because the service is offered via a platform API, which may be a HTTP or REST API endpoint. For example, REST API design standards can process HTTP requests and communication using the following HTTP commands over the Internet—and this is all the functionality that is required by the client, i.e. to be able to send and receive messages over the Internet. The platform processor(s) implement the commands remotely, or separately for the client.

| Commands | GET | POST | PUT | DELETE | PATCH |
|---|---|---|---|---|---|
| Resource | read | create | update or create | delete | partial update |

Figure 3:
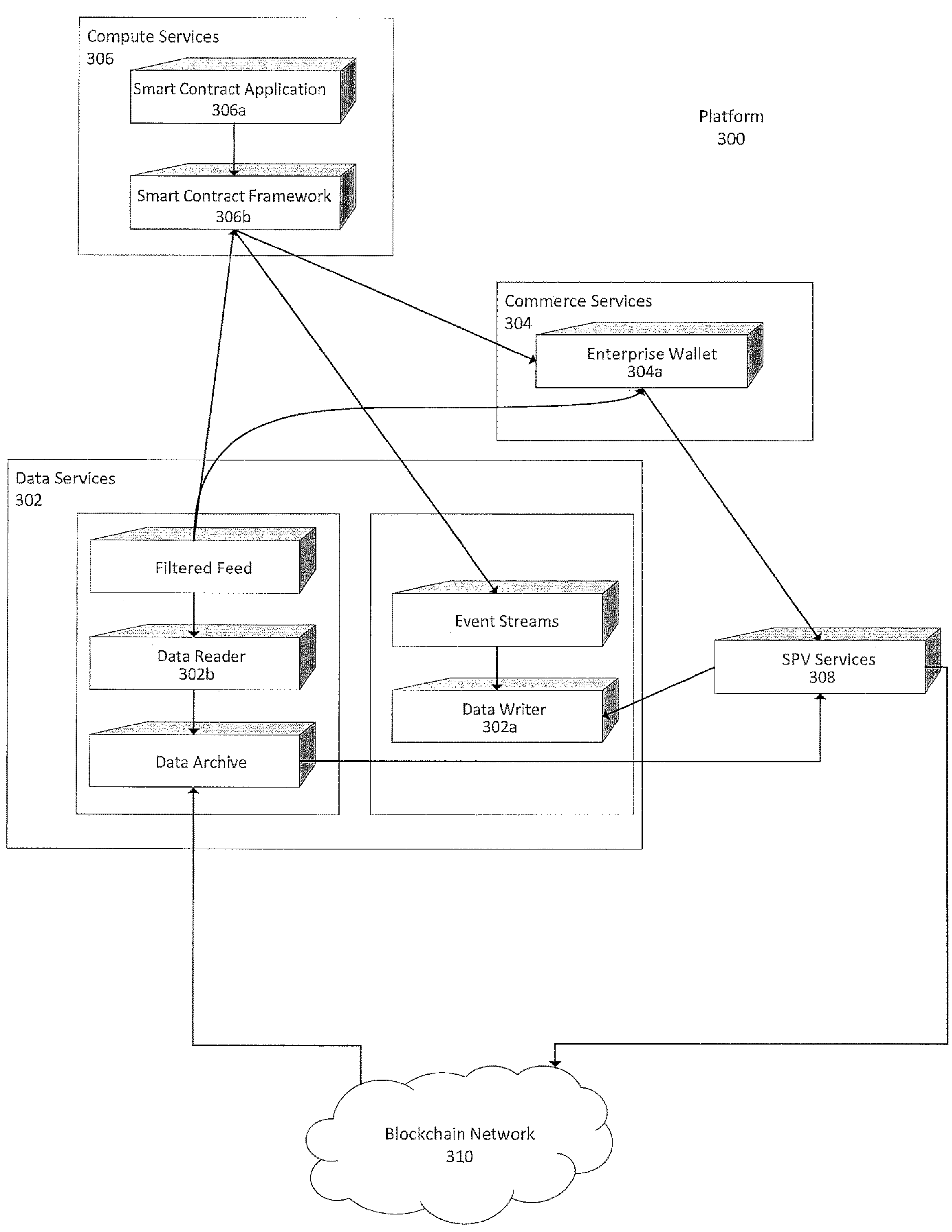
FIG. 3 is a schematic diagram, depicting the components of the platform of a plurality of services that are associated with a blockchain, according to the first aspect.

FIG. 3 provides a more granular schematic view of the plurality of services associated with a blockchain, and which can be implemented by the platform 300 that is associated with an API via which any one or more of the offered services can be accessed. As seen in this Figure, the data services 302 may include a data writer 302*a* and a data reader service 302*b*. The implementation of event streams using the data writer service 302*a* will be explained in detail in FIGS. 4 to 8, to enable clients to write data into the blockchain in a simple, secure and optimised manner. The data reader service 302*b* enables the clients to send queries, which returns data that is stored in the blockchain. This may be using Filtered streams in which the client may pre-define the type of data that they wish to read from the blockchain on an ad hoc or periodic basis, i.e. within certain timeframe, or those associated with a set of related or unrelated events or documents that are processed in the blockchain 310. The data archive feature allows access to logs of previous transaction for a specified event or contract.

The compute services 306 of the platform 300 includes an application 306*a* and framework 306*b* associated with smart contracts, which in some embodiments may be represented as a state machine in the blockchain 310. The compute services 306 interacts with the data services 302 as data will need to be input and results provided to a client for any such computation.

Commerce services 304 are responsible for provision of enterprise-class capabilities via enterprise wallets 304*a* for transacting over the blockchain 310, based on best-in-class security practices and technologies. For example, in some embodiments enterprise wallets may implement functionality to enable blockchain transaction processing when more than one person or user or account may need to sign off on a transaction meeting a defined criterion. i.e. associated with cryptocurrency of a large value above a certain predefined limit. An enterprise wallet may also include functionality to implement a threshold number and/or type of signatures to move large amounts of digital assets such as cryptocurrency or tokens representing another resource. The movement of these assets can then be represented on the blockchain following processing based on the criteria applied by such enterprise wallet implementation.

The SPV services 308 (simplified payment verification) are applications that require information from the blockchain but do not include direct links to it, as they do not run a miner node. Such SPV service 308 allows a lightweight client to verify that a transaction is included in a blockchain, without downloading the entire blockchain 310.

Figure 4:
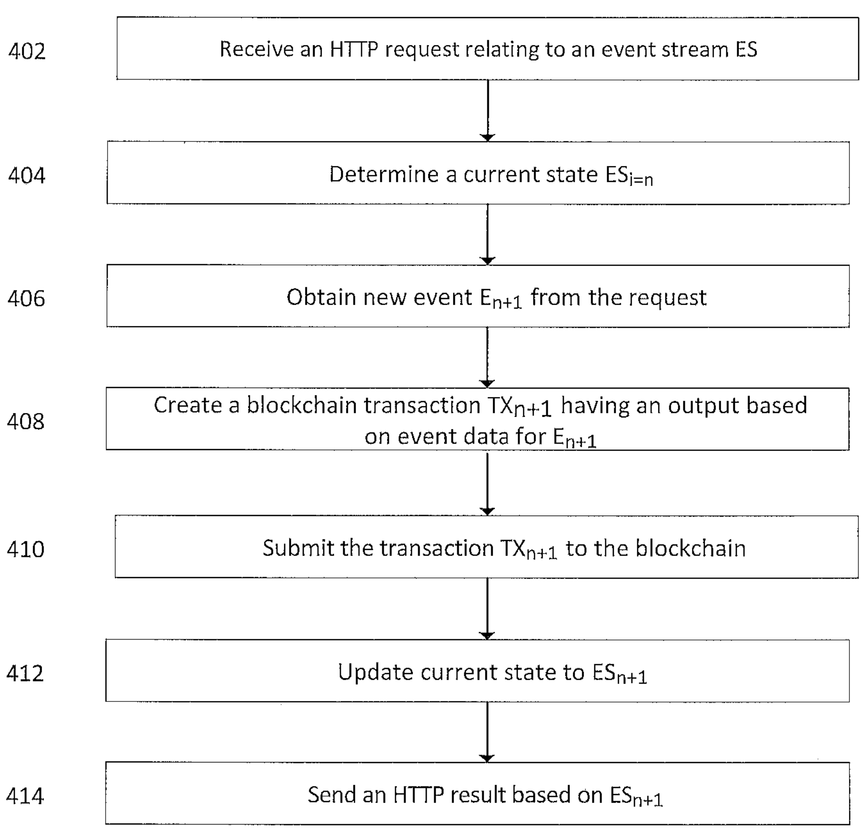
FIG. 4 is a flowchart, depicting a method for implementing a data-writing service for transactions associated with a blockchain, according to a second aspect, as implemented by one or more processors associated with a platform service.

Second Aspect—a Platform Providing a Data Writing Service Associated with a Blockchain FIG. 4 relates to a second aspect of the present disclosure and depicts a computer implemented method for providing a data writing service for transactions that are associated with a blockchain, such as the data writer 302*a* seen in FIG. 3 of the first aspect. The method of FIG. 3 is implemented by a platform processor associated with an application programming interface (API) for the service.

Step 402 depicts receiving a request from a client, the request relating to an event stream ES implemented using a blockchain. The request from the client being in a Hypertext Transfer Protocol (HTTP) transmission protocol format, as with the first aspect. In some embodiments, the event stream relates to a state machine, and represents a machine-readable contract or smart contract that is implemented as a finite state machine in the blockchain. A Finite state Machine (FSM) is a well-known mathematical model of computation. It is an abstract machine that can be in exactly one of a finite number of states at any given time. The FSM can change from one state to another in response to some external inputs—the change from one state to another is called a transition. An FSM may be defined by a list of its states, its initial state, and the conditions for each transition. In the Bitcoin SV Blockchain the UTXO set can be thought of as a state machine, with a given output's spent state being a function of previous inputs to the transaction (the machine). Thus, by replaying all transactions, the current spend state of any output, and the current contents of the UTXO set, can be established deterministically using the blockchain. Thus, in the embodiment of FIG. 4, the request can be considered as a request to alter a current state of a smart contract, implemented as an event stream ES in the blockchain.

Step 404 depicts determining a current state of the event Stream $ES_{i=n}$, by the data writer or a platform processor for implementing the data writing service. Let us consider that i is an integer from 0 to N, each integer i representing a given state of the event stream ES having a finite number of states, whereby i=0 represents the created event stream $ES_{i=n}$ represents the event stream ES in a current state in the blockchain, and i=N represents a final state of the event stream ES. Thus the current state of the event stream ES would be $E_n$.

Step 406 depicts identifying or obtaining data associated with a next or new event $E_{n+1}$ for the event stream ES based on the received request in step 402. In this embodiment, the new event may be data or a function to trigger an alteration of a state so that the event stream transitions to the next state.

Step 408 depicts the step of creating a blockchain transaction for a next event $E_{n+1}$ by one or more processors associated with the platform processor implementing the data writer. The blockchain transaction $TX_{n+1}$ includes at least:

- an input associated with a transaction output ($TXO_n$) from a previous transaction $TX_n$. This input spends the $TXO_n$ output from the previous transaction.
- an unspent output ($UTXO_{n+1}$) associated with event data representing the new event $E_{n+1}$. In some embodiments this is a data output, i.e. representing a data carrier element of the transaction.

There may be additional inputs, such as fund inputs to cover network mining fees as appropriate, and there also may be other outputs, such as change outputs for the transaction.

Step 410 depicts submitting the transaction created in step 408 to the blockchain. Here the transaction may be submitted to the blockchain, such as the Bitcoin SV network for inclusion in a subsequent block by a miner node or BSV node software associated with the platform processor.

Step 412 depicts updating the current state of the event stream ES to now be $ES_{i=n+1}$ based on the newly created event $E_{n+1}$, such that $ES_{i=n}=ES_{n+1}$. This corresponds to the latest transaction $TX_{n+1}$ submitted to the blockchain for ES. In some embodiments, the new state is identified and updated based on the event data output in the final transaction output $UTXO_{n+1}$.

Step 414 depicts sending a result based on the updated current state $ES_{n+1}$ in step 412, the result being provided based on the HTTP transmission protocol format to the client.

Figure 5:
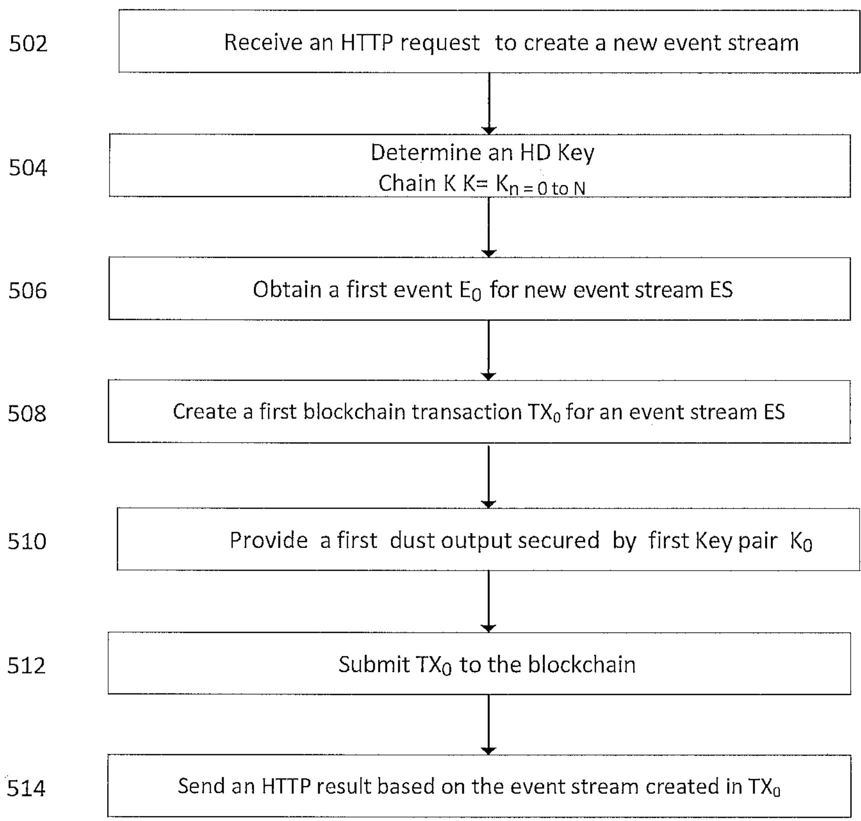
FIG. 5 is a flowchart, depicting a method for creating an event stream associated with a blockchain, according to a third aspect, as implemented by one or more processors associated with a platform service.
Figure 6:
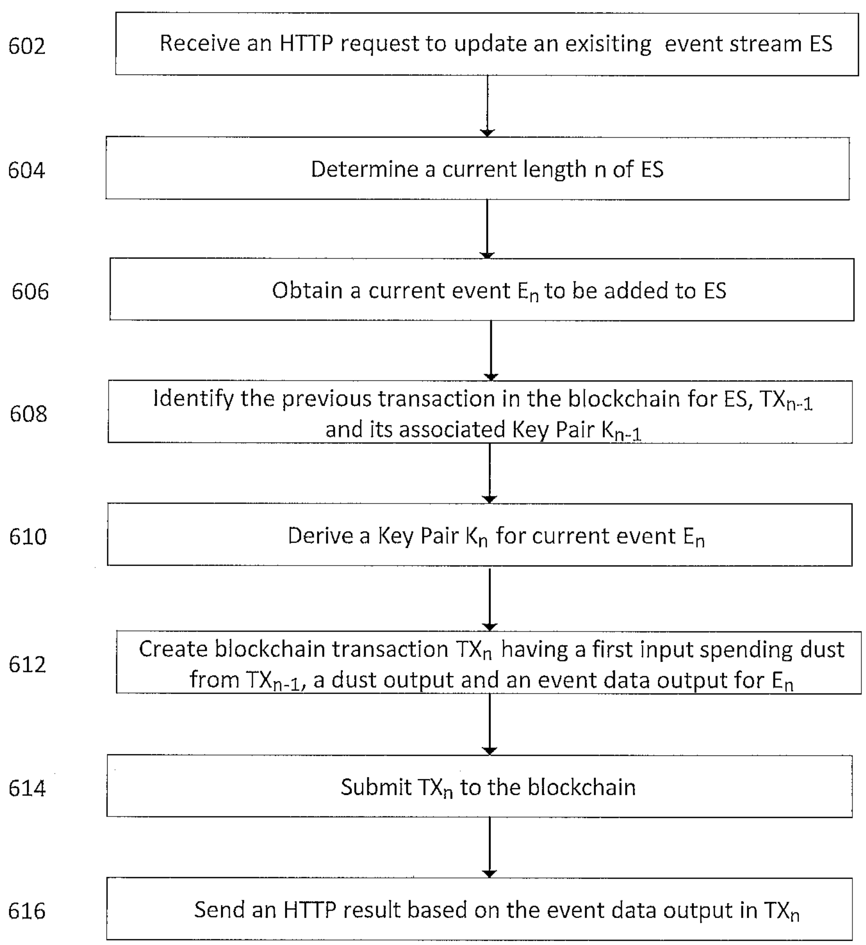
FIG. 6 is a flowchart, depicting a method for updating an event stream associated with a blockchain, according to the third aspect, as implemented by one or more processors associated with a platform service.
Figure 7:
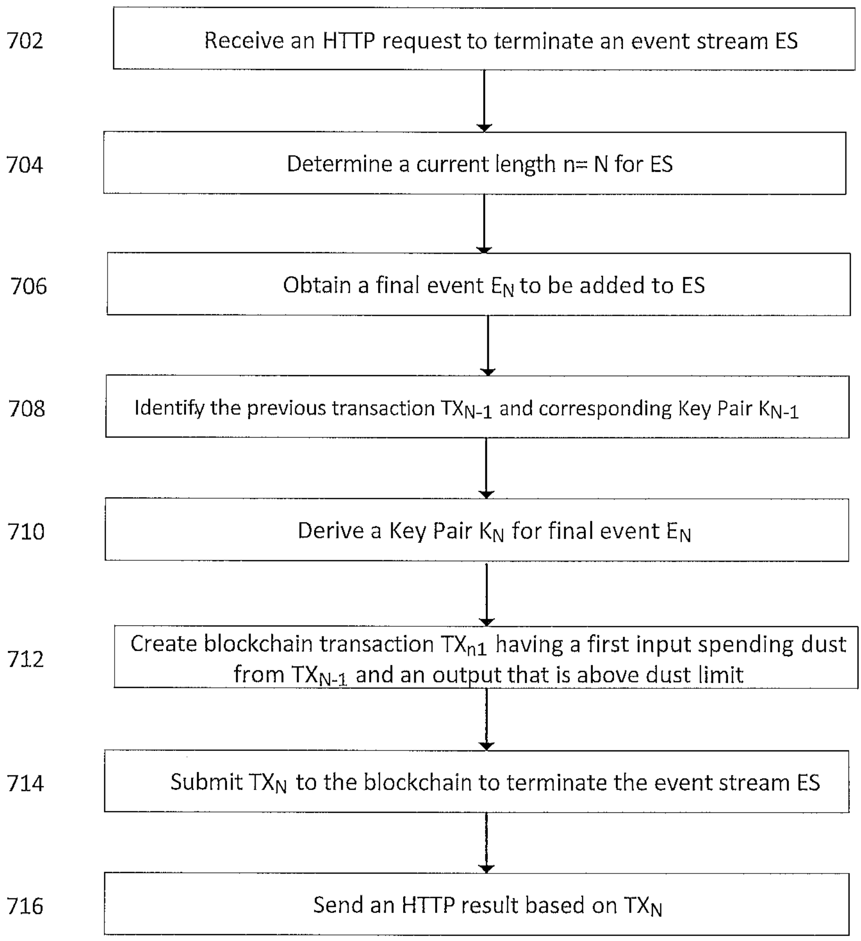
FIG. 7 is a flowchart, depicting a method for terminating an event stream associated with a blockchain, according to the third aspect, as implemented by one or more processors associated with a platform service.

Third Aspect—a Platform Providing a Data Writing Service for Recording an Event Stream Associated with a Blockchain FIGS. 5, 6 and 7 discuss an application associated with implementing event streams, such as those discussed in relation to FIG. 4 of the second aspect. The third aspect relates to a technique for establishing an immutable sequential log or record of the event stream ES up to its current state on the blockchain. In some embodiments, the log in addition to being stored on the blockchain, can also be provided or stored off-chain. As the state of the event stream is based on inputs and outputs associated with transactions, the techniques described below for the third aspect set out a method for establishing an immutable chronological log of all transactions associated with an event stream on the blockchain.

The event stream may represent sequential inputs that are applied to a smart contract that is implemented using an FSM, DFA etc.

FIG. 5 relates to the second aspect of the present disclosure and depicts a computer implemented method for providing a data writing service for transactions that are associated with a blockchain, such as the data writer 302*a* seen in FIG. 3 of the first aspect. The method of FIG. 5 is implemented by a platform processor associated with an application programming interface (API). The method relates to creating a new event stream.

Step 502 depicts receiving a request from a client, the request being to create a new event stream ES using the blockchain. The request from the client is in a Hypertext Transfer Protocol (HTTP) transmission protocol format, as with the first and second aspects.

Step 504 depicts the step of determining a hierarchical deterministic (HD) key chain K to be used with a new event stream ES to be created. In some embodiments, this may be implemented by a HD wallet implementation associated with the platform processor to generate a hierarchical tree-like structure of keys which start from the seed or parent or master key based on the known BIP 21 Protocol. The HD key creation and transfer protocol greatly simplifies key generation and permits creation of child accounts which can operate independently, gives each parent account the ability to monitor or control its children even if the child account is compromised. The HD protocol uses a single root seed to create a hierarchy of child, grandchild, and other descended keys with separate deterministically-generated integer values. Each child key also gets a deterministically-generated seed from its parent, called a chain code. This way, any compromising of one chain code doesn't necessarily compromise the integer sequence for the whole hierarchy. In addition to the above advantages, in the present aspect, this key generation is carried out by the platform processor, therefore removing the resource and functionality of this generated from the client. No HD wallet therefore needs to be implemented by the client. In step 504, key chain K includes a series of private/public key pairs derived from a selected parent key pair, such that: $K=K_{n=0\ to\ N}$, whereby n is an integer from 0 to N, each integer n representing a current length or current number of events associated with event stream ES, and N represents a maximum or final value of n.

Step 506 depicts identifying or obtaining data associated with a first event $E_0$, this being for the new event stream ES to be created in the blockchain based on event data in the received request in step 502.

Step 508 depicts creating a first blockchain transaction $TX_0$ for the new event stream ES where n=0 by one or more processors associated with the platform processor implementing the data writer.

Step 510 depicts that the output of the blockchain transaction $TX_0$ created in step 508 includes at least a first unspent transaction output ($UTXO_{0\_dust}$) being a dust output, said dust output associated with a locking script secured with a first derived key pair $K_0$ in the series of keys derived from the HD key chain K in step 504. A dust output is associated with a (digital asset) value that is below a defined limit for a transaction or having a defined minimum value, i.e. lower than a mining fee that would be required to spend such transaction. There may also be other inputs associated with digital assets associated with an operational float or digital asset or cryptocurrency fund that is maintained or associated with the payment processor. It is also possible to have other outputs in the transaction that are digital asset change outputs.

Thus, in some embodiments, a Create template for a blockchain transaction to create an event stream as per the present embodiment is one where the first input must be greater than dust. This is to advantageously indicate that there is no previous entry in the event stream, and this is the first entry. The Create template also specifies that first output of the template is dust, and that there is no data carrier or data output (so no OP_RETURN), as there is no event data associated with the Create state—other than the creation of a new event stream ES. In some embodiments, an OP_RETURN is included for the create frame, but this does not hold any event data. It may hold metadata describing the parameters of the newly created stream. Examples of metadata examples may include details such as publicise or notarise properties, write to blockchain time, time when events will first be accepted, time when events will no longer be accepted, geo-region where backing or related data will be stored, maximum size of acceptable data, sequence number and more.

Step 512 depicts submitting the transaction $TX_0$ to the blockchain. Here, the transaction may be submitted to the blockchain, such as the Bitcoin SV network for inclusion in a subsequent block by a miner node or BSV node software associated with the platform processor. In some embodiments, once mined, the transaction identifier $TX_0$ may be used to uniquely identity the newly created event stream ES.

Step 514 depicts sending a result associated with the created event stream ES in $TX_0$ to the client, the result being provided in the HTTP transmission protocol format. The result relating to the event stream may be copied or saved separately from the blockchain.

In some embodiments, the creation of the event stream may be decoupled from the submission to the blockchain for on-chain settlement. In this case, an event stream id that is unique to a respective event stream may also be used, and may be provided in the result to the client instead.

FIG. 6 relates to the third aspect of the present disclosure and depicts a computer implemented method for providing a data writing service for transactions that are associated with a blockchain, such as the data writer 302*a* seen in FIG. 3 of the first aspect. The method of FIG. 6 is implemented by a platform processor associated with an application programming interface (API). This figure is related to a request to append a new event to an existing event stream ES on the blockchain.

Step 602 depicts receiving a request from a client, the request being to amend an existing stream ES identified in the request and implemented in the blockchain. The request from the client is in a Hypertext Transfer Protocol (HTTP) transmission protocol format, as with the first and second aspects. As discussed in relation to step 504 of FIG. 5, the event stream ES on the blockchain is associated with a key chain K such that $K=K_{n=0\ to\ N}$, where n is an integer from 0 to N, each integer n representing a current length or current number of events associated with the event stream ES, where N represents a maximum or final value of n. In some embodiments, authentication and authorization checks are performed, which may be a test for the presence of an API access token, or a session check or a password/digital signature test, or some other appropriate method to validating the client or the service request made.

In step 604, the current length n of the event stream ES is determined.

Step 606 depicts identifying or obtaining data associated with an event $E_n$, this being the event to be currently added or appended to the event stream ES on the blockchain based on event data in the received request in step 602.

In step 608, a previous blockchain transaction $TX_{n-1}$ associated with the event stream ES is identified. Once identified, a key pair $K_{n-1}$ associated with the identified previous transaction $TX_{n-1}$ is then determined. As mentioned above, this is based on the same seed key pair K set out in step 602.

In step 610 a key pair $K_n$ for the current event $E_n$ is derived from the seed key pair K.

Step 612 depicts creating a current blockchain transaction $TX_n$ for the new event stream ES where $0<n<N$ by one or more processors associated with the platform processor implementing the data writer. The blockchain transaction $TX_n$ created for the current event $E_n$ to be appended to the event stream ES includes:

- a first input spending a dust output associated with the previous transaction $TX_{n-1}$, said spend authorised with the obtained key pair $K_{n-1}$ for the previous transaction obtained in step 608;
- a first unspent transaction output ($UTXO_{n\_dust}$) being a dust output for the current transaction $TX_n$, said dust output associated with a locking script secured with the derived key pair $K_n$ from step 610; and
- a final unspent transaction output ($UTXO_{n\_data}$) associated with event data representing the current event $E_n$.

As mentioned above, A dust output is associated with a (digital asset) value that is below a defined limit for a transaction or having a defined minimum value. There may also be other inputs associated with digital assets based on an operational float. This float may be controlled by the platform processor. It is also possible to have other outputs in the transaction that are digital asset change outputs.

Thus, in some embodiments, an Update template for a blockchain transaction to update an event stream as per the present embodiment is one where the first input must be dust and the first output must be dust. This is to advantageously indicate the presence of a previous entry in the event stream. This also indicates that the event in question $E_n$ (the present or current event data) comes after the previous transaction or state. Thus, the transaction advantageously follows the dust chain and comes before the next state. The Update template includes a data carrier, i.e. a data output that carries the event data or a result associated with the current event or state. This may be an un-spendable OP_RETURN output.

The use of dust outputs in the transaction is advantageous for maintaining an immutable sequential record of all transactions as they occur for an event stream ES in the blockchain. This is because, although by posting transactions to the blockchain all blockchain transactions would be timestamped and remain in order in the blockchain, this does not guarantee preservation of their sequential order. This is because transactions might be mined into blocks at different times. The use of a dust output of a previous transaction being spent as the first input of a current transaction, where the spend is based on respective unique keys pertaining to the locking/unlocking scripts of each transaction ensures a clear, sequential tamper proof record of the event stream in chronological order.

Step 614 depicts submitting the transaction $TX_n$ to the blockchain. Here the transaction may be submitted to the blockchain, such as the Bitcoin SV network for inclusion in a subsequent block by a miner node or BSV node software associated with the platform processor. In some embodiments, once mined, the transaction identifier may be used to uniquely identity the event stream ES.

Step 616 depicts sending a result associated with the created event stream ES in $TX_n$ to the client, the result being provided in the HTTP transmission protocol format. The result may be copied or saved separately to the blockchain. In some embodiments, this may be based on the event data in the final unspent transaction output ($UTXO_{n\_data}$). In some embodiments, the event data for the event $E_n$ in ($UTXO_{n\_data}$) includes a hash of said event data, thereby ensuring that this is kept private by the platform processor. The hash may be applied by the platform processor or be applied by the client, i.e. applied in some embodiments prior to generating the event data pertaining to the request that is received at the platform processor in step 602 for the event $E_n$. In the case of it being applied by the client, the event data in the request is private even before it reaches the platform processor. In other embodiments, the event data may be provided as raw data, publicly available from the blockchain.

FIG. 7 relates to the third aspect of the present disclosure and depicts a computer implemented method for providing a data writing service for transactions that are associated with a blockchain, such as the data writer 302*a* seen in FIG. 3 of the first aspect. The method of FIG. 7 is implemented by a platform processor associated with an application programming interface (API). The request in FIG. 7 is to terminate an existing event stream on the blockchain.

Step 702 depicts receiving a request from a client, the request relating to the termination of an existing event stream ES implemented using the blockchain. The request from the client being in a Hypertext Transfer Protocol (HTTP) transmission protocol format, as with the first and second aspects. As discussed in relation to step 504 of FIG. 5, the event stream ES on the blockchain is associated with a key chain K such that $K=K_{n=0\ to\ N}$, where n is an integer from 0 to N, each integer n representing a current length or current number of events associated with the event stream ES, where N represents a maximum or final value of n. In some embodiments, authentication and authorization checks are performed, which may be a test for the presence of an API access token, or a session check or a password/digital signature test, or some other appropriate method to validating the client or the request made.

In step 704, the current length N of the event stream ES is determined.

Step 706 depicts identifying or obtaining data associated with a final event $E_N$, this being for the event to be currently added or appended to the event stream ES on the blockchain based on event data in the request received in step 702.

In step 708, a previous blockchain transaction $TX_{N-1}$ associated with the event stream ES is identified. Once identified, a key pair $K_{N-1}$ associated with the identified previous transaction $TX_{N-1}$ is then determined. As mentioned above, this is based on the same seed key pair K set out in step 702.

In step 710 a key pair $K_N$ for the current event $E_N$ is derived from the seed key pair K.

Step 712 depicts creating a current blockchain transaction $TX_N$ for the new event stream ES where n=N by one or more processors associated with the platform processor implementing the data writer. The blockchain transaction $TX_N$ created for the current event $E_N$ to terminate the event stream ES includes:

a first input spending a dust output associated with the previous transaction $TX_{N-1}$, said spend authorised with the obtained key pair $K_{N-1}$ for the previous transaction obtained in step 708;

a first unspent transaction output ($UTXO_N$) associated with a digital asset that is above a defined dust output limit.

For the final event, all transaction outputs return change. There is no dust output as there is no requirement or need to track the next stage of the terminated event stream. Thus, no dust output is provided by the platform processor when n=N. In other words, the outputs may be considered as a change output (digital asset payment) associated with the event stream ES. This advantageously marks or indicates the final terminated state of the event stream being tracked. In some embodiments, there is also no event data or data carrier element, i.e. no OP_RETURN for event data, for the output as the event or contract is in a terminated state. Thus, separate dust and data carrier outputs are not generated to terminate the event stream ES and the first output is above the dust limit to signal that this is the end of the event stream on the blockchain, along with the absence of an event data output which also indicates termination. In embodiments where there is metadata in the OP_RETURN instead of event data, this metadata may be helpful to a verifying entity. There may be other inputs or change outputs associated with a digital asset from an operational float. In some embodiments, the value of the digital asset associated with the dust set out in relation to FIGS. 5 and 6 may simply be added to the one or more other outputs.

Thus, in some embodiments, a Close template for a blockchain transaction to terminate an event stream as per the present embodiment is one where the first input must dust be dust, like the first input of the Update template in FIG. 6. The first output must not be dust, and this advantageously acts as an end-of-ledger marker and furthermore distinguishes the Close template from the Update template. Like the Create template in FIG. 5, there may be no data carrier for event data, but the OP_RETURN may include metadata in the Close template.

Step 714 depicts submitting the transaction $TX_N$ to the blockchain. Here the transaction may be submitted to the blockchain, such as the Bitcoin SV network for inclusion in a subsequent block by a miner node or BSV node software associated with the platform processor.

Step 716 depicts sending a result associated with the created event stream ES in $TX_N$ to the client, the result being provided in the HTTP transmission protocol format.

Figure 8:
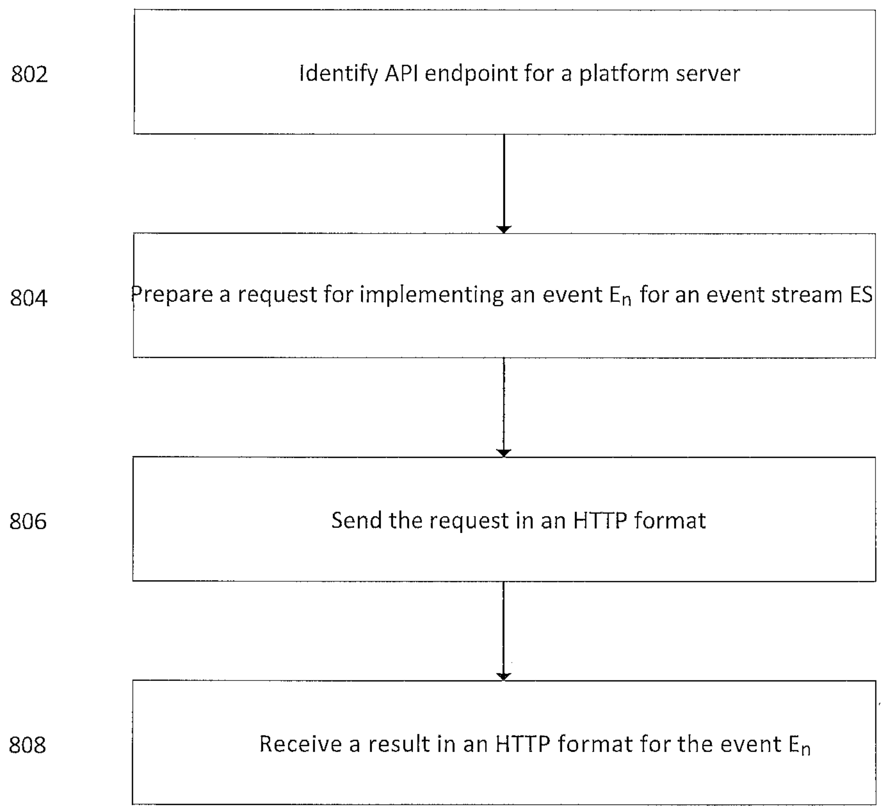
FIG. 8 is a flowchart, depicting a method for accessing a data-writing service for transactions associated with a blockchain, according to a second or third aspect, as implemented by one or more processors associated with a client.

FIG. 8 relates to the third aspect of the present disclosure and depicts a computer implemented method for accessing a platform or a data writing service for writing data into an event stream associated with a blockchain, such as the platform 100 shown in FIG. 1 or platform 300 in FIG. 3. The method of FIG. 8 is implemented by one or more processors associated with a client.

In step 802, the application programming interface (API) endpoint associated with the platform is identified. As mentioned before, this may be the API associated with a host platform processor, and there may be one or more further processors responsible for implementing the service, that each have a service endpoint or a destination address.

In step 804, the client prepares a request for a service, such as the data writing service 302 in FIG. 3. The request is associated with one or more events $E_n$ pertaining to an event stream ES in the blockchain. The client in some embodiment includes a client alias or identifier and/or a service identifier in the request, so that the request can be routed to the correct service endpoint, and so that the platform processor can check the validity of the requesting client and the client's permission to use the requested service.

In step 806, the request prepared in step 804 is sent using a Hypertext Transfer Protocol (HTTP) or similar transmission protocol format, as the platform processor is implemented as a HTTP or REST API.

In step 808, a result is received that pertains to an output script of a blockchain transaction associated with the event $E_n$ in the request. This result is provided to the client in the HTTP transmission protocol format. In some embodiments, the result may be saved in a log separately to the blockchain, either in or associated with the platform processor.

Advantageously, the implementation of an event stream and its sequential log associated with the blockchain as implemented by the methods of the third aspect of the present disclosure offers guarantees relating to immutability of events and immutability of event sequencing. Once written, any attempt to tamper with the event stream in any of the following ways is either prevented or made evident:

Changing the contents of an event

Re-ordering events

Inserting events at the start or middle of a stream

Removing events from anywhere in the stream

In other words, the methods according to the third aspect makes the following attributes relating to the event stream provable:

Individual entries in the event stream have not been modified since they were written No entries have been inserted between previously contiguous entries No entries have been removed No entries have been reordered These properties and advantages have many practical applications, from audit/compliance logs, to state machine replication, to more efficient, tamper resistance and accurate methods for reading from and writing data into the blockchain for all clients.

An example for an event stream for which capture of an event log would be useful is an application to track and record the event of a game, such as Noughts O and Crosses X using the blockchain.

For instance, consider the game up to n=4 (5 states from 0 to 4) is in the following state:

| | A | B | C |
|---|---|---|---|
| 1 | ○ | | ○ |
| 2 | | ○ | |
| 3 | X | | X |

As the game proceeds, by the method of the third aspect, a log based on the output of the blockchain transactions may be recorded as follows:

| | |
|---|---|
| 0 | B2 |
| 1 | A3 |
| 2 | A1 |
| 3 | C3 |
| 4 | C1 |

Consider that there is an attempt to tamper with or change a copy of a log this is maintained for this sequence, such as insert a different entry for the result when n=4 so that the log does not reflect the actual state of the game—as given below:

| | |
|---|---|
| 0 | B2 |
| 1 | A3 |
| 2 | A1 |
| 3 | C3 |
| 4 | B3 |
| 4 | ~~C1~~ |

This will be immediately identified from a check or audit of the automatically generated sequential log of the event stream on the blockchain, as the input of the transaction that spends the dust output for a transaction where n=3 will not be validated. It will be appreciated that where such games involve financial transactions (e.g. pay to play), there may be a desire from players to check the veracity of their game logs and whether or not a given games provider is adhering to the odds or difficulty that they are advertising. By storing individual game entries (or hashes thereof) for a given game in an event stream as described above, players can be assured that in-game events can be checked and verified independently of any internal system maintained by the games provider.

It will be further appreciated that each event in a given event stream need not correspond to individual events occurring within a gaming session. An event stream may be defined for any log of events where an accurate, sequential, tamper-proof log of said events is desirable. Examples of events in a given event stream may include, e.g. inputs and/or outputs of a given smart-contract being executed locally or remotely (preferably off-chain); messages sent between two or more participants of a given online messaging conversation; physical measurements performed by sensors or IoT devices for measuring e.g. weather, locations of e.g. vehicles, goods, people, etc.;_drug/medicine tracking— including e.g. source of manufacture, transportation, dispenser location, prescribed dosage, recipient information, etc.; financial transactions, such as e.g. an amount an account is credited and/or debited (regardless of whether the account is credited with cryptocurrency or fiat), changes in exchange rate, execution of trades, requests for the purchasing of goods or shares, etc. Ultimately, the context in which the event stream is generated and used will be at the leisure of the party using the platform processor to generate such an event stream.

Figure 9:
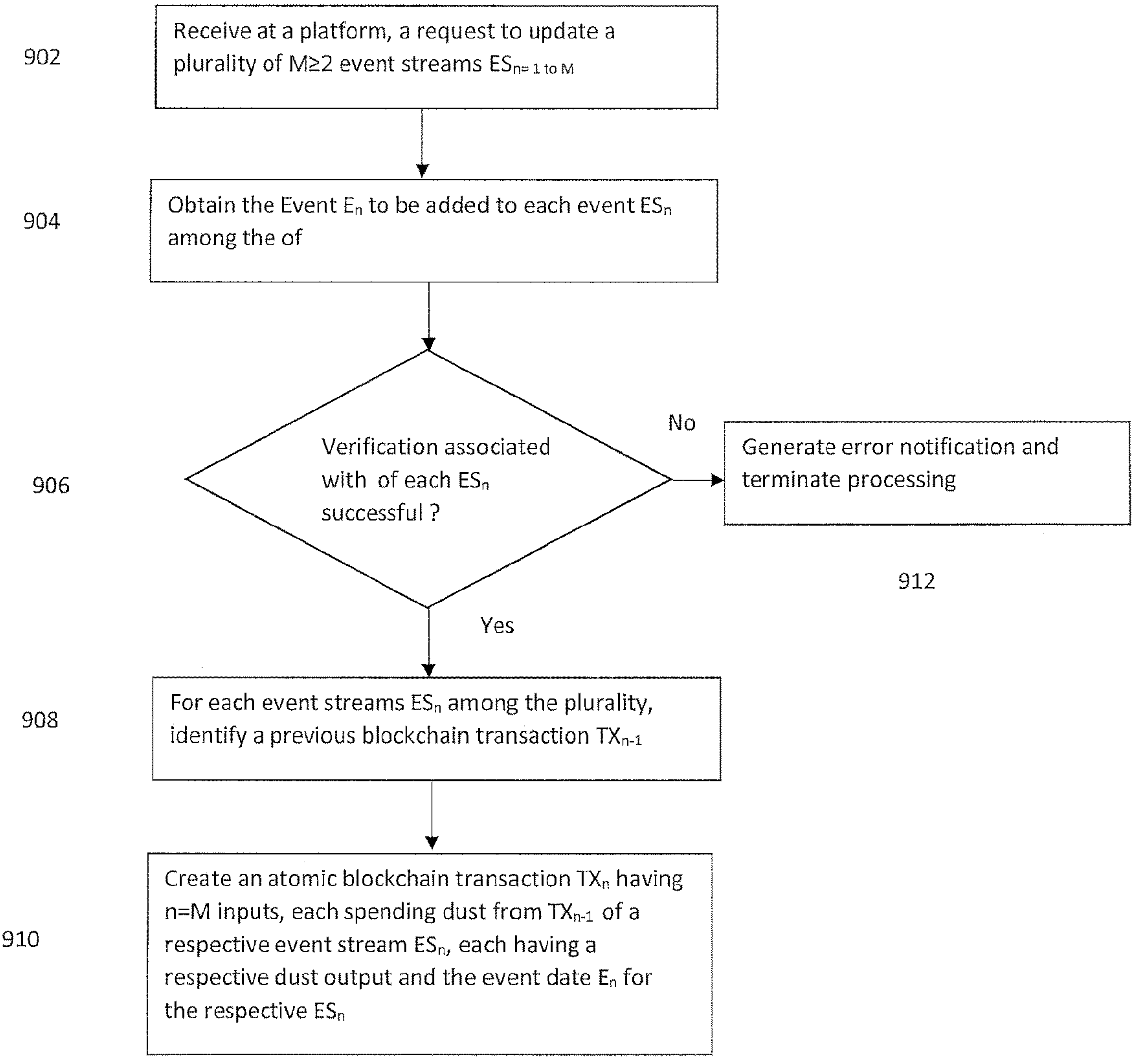
FIG. 9 is a flowchart, depicting a method according to one embodiment for synchronising a plurality of event streams, according to a fourth aspect, as implemented by one or more processors associated with a platform service.

Fourth Aspect—a Platform Providing a Data Writing Service for Synchronising Multiple Event Streams Associated with a Blockchain FIG. 9 illustrates a technique for updating a plurality of event streams. An event stream is discussed in relation to the second and third aspects above, especially FIG. 6, which refers to a method for appending data to or modifying a single event stream. In addition to establishing an immutable sequential log or record of the event stream up to its current state on the blockchain, the fourth aspect of the present disclosure enables a plurality of separate events stream, each capable of progressing separately as set out in FIGS. 5 to 7, to be synchronised. As with the second and third aspect, the event streams once synchronised in accordance with the fourth aspect, in addition to being stored on the blockchain, can also be provided or stored off-chain. As the state of each of the plurality of event streams is based on inputs and outputs associated with blockchain transactions, including the single or atomic transaction that synchronises the streams by appending a synchronising event to all provides an immutable chronological log of all transactions, wherein the point of synchronisation can be traced back to the single atomic transaction. As mentioned above, the event data associated with an event for synchronising the plurality of event streams may be same for each of the plurality of event streams, or may be different for at least one of more the plurality of event stream, or there may be no event data in some cases. The references made to the current or synchronising event in FIG. 9 are understood to cover all these possibilities. For ease of explanation only, and with no limitation implied, some embodiments of the fourth aspect are explained in terms of a single event or in cases, the same event data. FIG. 9 relates to the fourth aspect of the present disclosure and depicts a computer implemented method for providing a data writing service for synchronising a plurality of event streams. This method may be implemented by a platform processor offering a function or service like the data writer 302*a* seen in FIG. 3 of the first aspect. The method of FIG. 9 is implemented by a platform processor associated with an application programming interface (API). In most cases, this API is an endpoint that is different to the API indicated in FIG. 6 which teaches a method to update a single event stream. However, it is possible for the API to be the same endpoint as the API in FIG. 6 in some cases, if there is functionality for the same endpoint to service multiple event streams at once. FIG. 9 is related to a request from a client to append a new event to a plurality of M event streams on the blockchain in order to synchronise all of the M streams.

Step 902 depicts receiving a request from a client, the request being to synchronise a plurality of M existing event streams $ES_{n=1\ to\ m}$ associated with the blockchain, n being an integer from 1 to M, where M≥2. In some embodiments, the request from the client is in a Hypertext Transfer Protocol (HTTP) transmission protocol format, as with the earlier aspects.

As discussed in relation in relation to the third aspect, in some embodiments each event stream $ES_n$ among the plurality of M event streams $ES_{n=1\ to\ m}$ may also be associated with a key chain K specific to the given event stream $ES_n$ such that $K=K_{0\ to\ i}$, where in this embodiment, i is an integer representing a current index value or length or current number of events associated with the given event stream $ES_n$. Other authentication and verification checks for a client's authority to append to a given event stream may also be performed based on asymmetric key pairs or digital signatures which may be a test for the presence of an API access token, or a session check or a password/digital signature test, or some other appropriate method to validating the event stream $ES_n$ or the service request made.

The request from the client may be received at the API in this step as a JSON object having an identifier for each of the plurality of event streams $ES_{n=1\ to\ m}$, i.e. M event stream identifiers will be included in the JSON object representing the request. In some embodiments, the request from the client may also specify the target index for one or more identified event stream $ES_n$, the target index being the next available index or in other words representing the actual or current length+1 of the event stream to be used for the synchronisation request.

Step 904 depicts identifying or obtaining data associated with a current event $E_n$ from the request in step 902. This is the data used to synchronise the plurality of M event streams and is the event $E_n$ to be added or appended to each of the M event streams $ES_n$ identified in the request.

In some embodiments, a mentioned above, there is a possibility for the event data associated with the event $E_n$ added to each stream as part of the synchronisation process may differ from one or more of the other streams among the plurality. For instance, it may be that metadata associated with each event stream is different when compared to the other participating event streams. The metadata may be associated with a synchronising logical clock, usage of different currency or exchange rates specific to a given event stream, addition of a random value, i.e. a salt to each stream, properties of a hash and/or salt function etc.

Step 906 depicts an embodiment where one or more verification steps taking place before the synchronisation of multiple streams can take place. When a request is received at the API in step 902 to synchronise two or more streams, each stream $ES_n$ among the plurality $ES_{n=1\ to\ m}$ will be validated by checking that a signature provided against the public key supplied when the event stream was created validates over a signed input to the stream, in this case the data is the request to append the synchronising event $E_n$. For instance, the signature may be based on a public key provided for a given event stream on creation (see FIG. 5).

The synchronisation request will then only proceed if the validation is successful for each of the plurality of M event streams $ES_{n=1\ to\ M}$. Even if one fails; the synchronisation request does not proceed, and an error message may be generated as indicated in step 912.

In some embodiments, this step also includes verification of whether the target index for the data $E_n$ specified for one or more of the identified event streams, where available, by the client in step 902 matches with the last index of the event stream. This will be the next available index for appending data into the respective event stream. This is carried out for all M plurality of event streams $ES_{n=1\ to\ M}$ If one fails, then the synchronisation does not proceed, and an error message is generated in step 912. This step therefore checks for concurrency, and verifies that there are no requests that may overlap in time associated with a given event stream that may have resulted in actual index value may have changed.

An example of an error response where the target index does not match with the actual last or next available index in an event steam id1, but it does match for event stream id0 is identified in a JSON request object is given below:

```
[
  {
    "id": "<esid0>", "ref": "<client reference>",
    "result": "unchanged",
    "index": <esid0.last_index>
  },
  {
    "id": "<esid1>",
    "result": "badIndex",
    "index": <esid1.last_index>
  }
]
```

Following successful validation in step 906, in step 908, for each event stream $ES_n$ among the plurality of M event stream $ES_{n=1\ to\ M}$, a previous blockchain transaction $TX_{n-1}$ associated with the respective event stream ES is identified. As mentioned above set out in step 902, a seed key pair K or key chain may be associated with and be specific to each event stream $ES_n$. In this case, a key pair $K_{i-1}$ associated with the identified previous transaction $TX_{n-1}$ is then determined. Based on this, a key pair $K_n$ for the current event $E_n$ to be added to the event stream $ES_n$ is derived from the seed key pair K.

Step 910 depicts the creating an atomic blockchain transaction $TX_n$ for the current event $E_n$ to be appended to each of the M event stream $ES_n$ in order to synchronise the plurality of event streams $ES_{n=1\ to\ M}$. This transaction is a single transaction that updates multiple streams, in order to synchronise the M event streams with a given event $E_n$. The atomic blockchain transaction may be referred to as a rendezvous transaction. Such transactions are an enhancement to event streams in FIG. 6 that enable a single append operation, as they can append the same event to multiple streams atomically, i.e. either all event streams party to the rendezvous or atomic transaction are extended or synchronised with the given $E_n$, or none are. The event $E_n$ may be associated with the same event data for all, or the event $E_n$ different event data for one or more of the plurality of M event streams.

Atomic or rendezvous transactions are transactions across event streams and unlike the transaction in step 612 of FIG. 6, these transactions involve constructing multiple dust chains, each respective to a given event stream $ES_n$ among the plurality M as the first inputs.

Thus the atomic blockchain transaction $TX_n$ comprises:

n=M inputs, each input associated with a respective event stream $ES_n$ among the plurality, each $n^{th}$ input spending a dust output associated with the previous transaction $TX_{n-1}$ of the respective event stream $ES_n$, for each of the n inputs, a respective unspent transaction output ($UTXO_{n\_dust}$) being an $n^{th}$ dust output for the atomic transaction $TX_n$ associated with the respective event stream $ES_n$, and an unspent transaction output ($UTXO_{n\_data}$) associated with event data representing the current event $E_n$, i.e. the data carrier.

As with the above aspects, there may be additional inputs, such as fund inputs to cover network mining fees as appropriate, and there also may be other outputs, such as change outputs or data carrier outputs such as OP_RETURN associated with each event stream for the atomic transaction.

If an event stream $ES_n$ is associated with a key chain K, then similar to in step 602, the respective $n^{th}$ dust input spend is authorised using the obtained key pair $K_{i-1}$ for the previous transaction obtained in step 908. The $n^{th}$ dust output for the atomic blockchain transaction $TX_n$ is associated with a locking script secured with the derived key pair $K_n$ from step 908.

In all event streams discussed in the present disclosure, tracking the dust inputs/outputs, i.e. the chain-of-dust, transactions is used to prevent reordering of entries in the log, prevent after-the-fact of insertion/deletion, forks, i.e. alternative timelines, etc. leveraging the blockchain network's security, immutability, and double-spend prevention. This chain of dust formed by the $n_{th}$ input/output pair on a series of data carrier transactions collectively secure a respective single event stream $ES_n$.

As with standard event stream dust chain transactions, the rendezvous or atomic transactions contains a dust chain, platform funds and change (for transaction fees), and a data carrier for each event stream. However, the atomic transactions allow for many dust chains, each relating to a different event stream to pass through the single blockchain transaction.

All dust chain pairs therefore proceed platform funds and change. The data payload or event data $E_n$ used for synchronisation in the above described embodiment will be the output in an atomic transaction. The semantics of this transaction are to append that data payload to all streams whose dust chains are included in the opening n=M input/ output pairs, effectively providing an atomic commit of data across multiple event streams.

In some embodiments, such as set out above in FIG. 9, the input and output indexes have a one-to-one mapping, with the single data element having the final output index. As mentioned above, it is possible to separately verify if the plurality of event streams participating in an atomic blockchain transaction have been correctly synchronised/updated. An auditor or verifying entity or program may require the input index used for a respective event stream $ES_n$ for checking that particular event stream. In some embodiments, indices may be supplied via the platform processor as part of the metadata that may be available to the client or the verifying entity, or the indices may be obtained on-chain through observation of the transaction inputs i.e. by scanning the inputs to match with the output of the previous event of a respective event stream.

Assuming that a verifying entity acting on behalf of a client owns or has access to the event streams being verified, let us consider an example of verifying an event stream that has been synchronised using the method of FIG. 9 using a double entry accounting policy where it is desired to verify that every balance change of an account is matched with an equal and opposite balance change of another account. This example is not limited to just one debit and one credit account, and it may apply to any number of accounts so long as the sum of all balance changes for an issuer and an asset is zero. In a first example, consider a currency exchange example that requires the use of 6 accounts, 2 operated by Alice, 2 operated by a broker or exchange entity and 2 operated by Chris. Consider that Alice and Chris agree to exchange 1X for 2Y, where 1X=0.5Y. Alice transfers 1X to Broker, and receives 2Y from Broker. Chris transfers 2Y to Broker and receives 1X from Broker.

Alice −1X & Broker+1X
Alice+2Y & Broker −2Y
Chris −2Y & Broker+2Y
Chris+1X & Broker −1X In this way the sum of all changes for X is zero and the sum of all changes of Y is zero.

In a second example, let us assume Alice and Chris share the same Issuer for both X and Y assets, they it is possible to swap with each other without the broker.

AliceX −1→ChrisX+1; sum of X is zero
ChrisY −2→AliceY+2; sum of Y is zero

This these 4 balance changes may be bound together in a single rendezvous transaction. If these were split into four individual transaction, any one transaction might fail resulting in an imbalance in either X or Y (i.e. creation or loss of the asset). If it were split into two rendezvous transactions, one might fail and either Alice of Chris would not receive their X or Y.

In a third example, consider two event streams A and B, where A represents an account that is using exchange rate or agreed offset X and B represents an account that is using an exchange rate or agreed offset Y for a given currency, where 1X=0.5Y. Consider that the two accounts are to be synchronised when A transfers 2 units of currency at offset X to B. While this transfer represents the synchronising event $E_n$ for each stream, the event data associated with each is likely to be different. For A, the event data may represent a decrease of 2 units at offset X. For B, the event data may represent an increase of 1 unit at offset Y, which is the equivalent of an addition of the 2 units at offset X that is transferred from A.

In some cases, the transfer may be split into two separate atomic transactions, one for a 2X subtraction event from A that is recorded in both event streams, and another for the addition event of the 1Y unit into B, also recorded in both streams.

The verification may be processed sequentially to check the events of a given event stream $ES_n$ stream, until an atomic blockchain or rendezvous transaction is encountered. From this point, the verifying entity may review other accounts also associated with the client and perform a zero-sum calculation. in the first examples, the client may be the issuer account, i.e. Alice. Any error may then be flagged at this stage, and if there are none, the verifying entity simply proceeds to verify the next event in the stream that it is checking.

An example of an atomic transactions inputs/outputs appending to three streams is given below:

| | |
|---|---|
| Spend dust 1 | Output dust 1 |
| Spend dust 2 | Output dust 2 |
| Spend dust 3 | Output dust 3 |
| platform funds (for transaction fees) | platform change (=funds − fees) |
| | OP_RETURN data carrier (semantically appended to all streams) |

Figure 11:
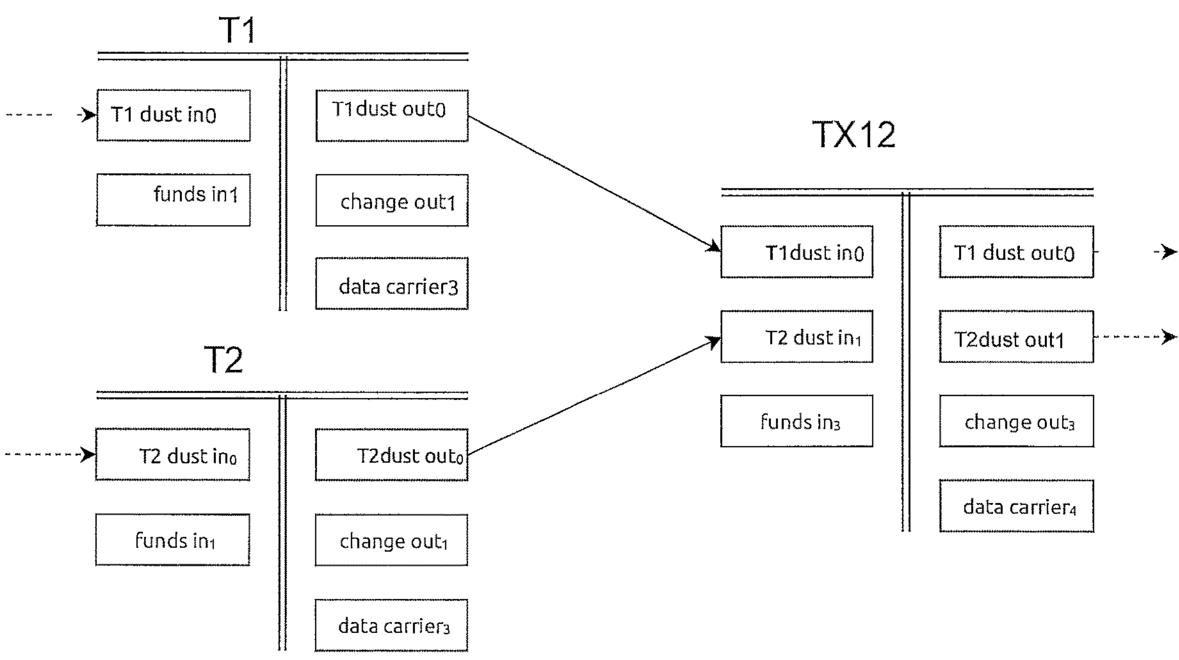
FIG. 11 is a basic schematic representation of an atomic blockchain transaction for two event streams, according to the fourth aspect.

An example of an atomic transaction associated with two event streams T1 and T2 is seen in FIG. 11. In this Figure It will be seen that the dust input/output pair of each T1 and T2 are the first two entries in the atomic transaction TX12 at index 0 and index 1, respectively. TX12 tracks the dust chains associated with both event streams, T1 and T2.

Following the atomic transaction synchronising the plurality of event streams $ES_{n=1\ to\ M}$, the API endpoint in some embodiments returns a response array of next available index values associated with each event stream $ES_n$ in the plurality $ES_{n=1\ to\ M}$. This may be provided to the client requesting the synchronisation. The response array may be provided for the purposes of independent verification for each event stream, or so that the client is aware of which index values to use for a respective event stream $ES_n$ for request for a next event. If the index is unknown for one or more event stream, for instance, if the event stream is empty, a NULL value may be included for an event stream.

Once the data has been appended, and therefore synchronised across all of the multiple M event streams, each respective event stream $ES_n$ may proceed independently, as separate streams, such as discussed in the third aspect, following the atomic transaction.

An example of an atomic or rendezvous transaction is given below in tables 1,2 and 3 below using the API endpoint/rendezvous

TABLE 1

Example of a rendezvous parameter
A set of authorised instructions that /rendezvous must validate and execute

```
{
  "instructions": [
    {
      "id": "<esid0>",
      "data": "<data0>",
      //optional
      "ref": "<reference>",
      "delegate": "<index>",
      "action": "appendEvent",
      "appendIf": integer, "tags": ["<tag>"],
      "validFrom": "<iso6801>", "validUntil": "<iso6801>"
    },
    {
```

TABLE 1-continued

Example of a rendezvous parameter
A set of authorised instructions that /rendezvous must validate and execute

```
            "id": "<esid1>",
            "data": "<data1>"
        }
    ],
    "authorisations": [
        {
            "id": "<esid0>",
            "alg": "HS256",
            "sig": "<sig(esid0.pk, instructions)>"
        },
        {
            "id": "<esid1>",
            "alg": "HS256",
            "sig": "<sig(esid1.pk, instructions)> "
        }
    ]
}
```

TABLE 2 elements of a rendezvous parameter

| Element name | Type | Description |
|---|---|---|
| | | instructions |
| id | String | The id of an Event Stream to append the data. The id must reference an Event Stream that exists and is still accepting new or append items/events |
| data | String | The data that will be appended to the specified Stream. |
| ref | String | [optional] A client reference string. If supplied, this reference must be quoted back to the client (exactly as supplied), in any response. |
| tags | Sting | [optional default = null] An array of tag Strings. ES will record the tags in the database ready to be used when filtering queries on data. |
| appendIf | integer | [optional] If the element being appended has an index other than this integer value, it is an error. This is similar in operation to when appendEvent uses a sequence number. However, if the specified index is already used, it is an error (expected response is HTTP 409 Conflict). |
| validFrom | ISO 6801 | [optional] The earliest datetime for this instruction to be valid. |

TABLE 2-continued elements of a rendezvous parameter

| Element name | Type | Description |
|---|---|---|
| validUntil | ISO 6801 | [optional] The latest datetime for this instruction to be valid. |
| | | authorisations/signatures |
| id | String | Must be the same as one of the ids in the instruction elements. |
| alg | HS256 or similar | [optional default = "HS256"] The name of the algorithm used to sign the instruction identified by id. |
| sig | Base64 encoded | Signature over the whole instruction element above. Although the public key comes from a specific Stream, the signature is over ALL instructions not just the element relating to that Stream. |

TABLE 3 status values returned by rendezvous
/rendezvous result

| Name | Status | Description |
|---|---|---|
| ok | Successful | The rendezvous transaction has been completed successfully. |
| unchanged | Failure | Because of an issue with another Stream. |
| badJson | Failure | Because the whole request or an element was poorly formatted. |
| badTags | Failure | Because of an issue with the tags element for this Stream. |
| badSig | Failure | Because the signature could not be verified. |
| badAlg | Failure | Because the signature algorithm is unsupported. |
| badData | Failure | Because the data was missing, empty or poorly formatted. |
| timeBefore | Failure | Because the instruction was received before validFrom. |
| timeAfter | Failure | Because the instruction was received after validUntil. |
| unknown | Failure | Because the stream is not known. |
| finalised | Failure | Because the stream has already been finalised. |
| restricted | Failure | Because the stream's Account holder is over budget and the Stream is temporarily unable to consume resources. |
| badIndex | Failure | Because the index was not as expected. Caller should synchronise its data from the underlying Event Stream. |

An example of the operation flow according to the fourth aspect based on Tables 1 to 3 is given below /rendezvous will perform the following actions:

1. Validate for well-formed JSON parameter, or return an error message
2. Iterate over authorisations or signatures.
3. Use id to obtain the public key for each stream, or return unknown.
4. Using alg and the public key to validate the sig over instructions, or return badSig. Each sig is over the whole instructions, not just the element relating to a particular stream.
5. Each id in authorisations must match with exactly one id in the instructions. If there is not an exact 1 to 1 match of signatures and instructions, return badSig.
6. For each Stream .1. Check validFrom > now( ) and validUntil < now( ), or return timeBefore or timeAfter.

.2. Lock the Stream if appendIf == last_index or return badIndex if not.

.2.1. If appendIf is not present, locking is not required for that particular Stream.

.3. Append data to the Stream, setting the tags metadata and establish a new last_index.

7. Collect last_index for each stream and build a response array.

```
[
    {
      "id": "<esid0>", "ref": "<client reference>",
      "result": "ok",
```

-continued

```
        "index": <esid0.last_index>
    },
    {
        "id": "<esid1>", "ref": "<client reference>",
        "result": "ok",
        "index": <esid1.last_index>
    }
]
8.          Unlock any locked Stream.
9.          Return response array.
```

Following the operation, the plurality of event streams $ES_{n=1\ to\ M}$ are submitted to the blockchain to be settled on-chain in the single multi-input/multi-output rendezvous or atomic transaction. At the time of on-chain settlement, the API in step 902 collects each of the M event streams to be settled on chain and groups them into a single blockchain rendezvous transaction.

Figure 9A:
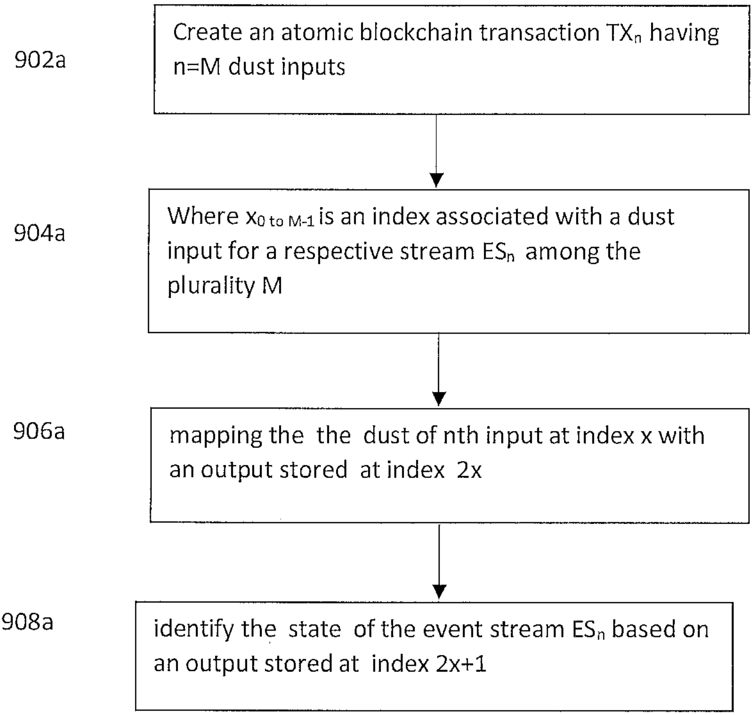
FIG. 9*a* is a flowchart, depicting another embodiment for synchronising a plurality of event streams, according to the fourth aspect, as implemented by one or more processors associated with a platform service.

FIG. 9*a* depicts an embodiment of the fourth aspect where, in addition to the advantages associated with atomic or rendezvous transactions explained above, there may also be a need to track a state associated with the plurality of event streams participating in the synchronisation, in additional to the event data $E_n$. Thus in this embodiment, the atomic blockchain transaction is associated with an additional output to track the state of a respective event stream $ES_n$ among the plurality of participating event streams.

It may be understood that steps 902 to 908 of FIG. 9 have occurred prior to FIG. 9*a*.

In step 902*a*, an atomic blockchain transaction is created, wherein for each participating event stream $ES_n$ among the plurality of event streams $ES_{n=1\ to\ M}$, a dust input, i.e. an input that spends the dust of a previous blockchain transaction is provided.

In step 904*a*, an index x, which is a transaction index associated with the dust input for the respective stream $ES_n$ in the atomic blockchain transaction, is identified. This index x is identified for each of the participating event streams. As mentioned above, each event stream may have its own OP_RETURN output for event data $E_n$ or meta data. Therefore a one-to-one mapping of dust inputs and output, such as explained in step 910 pf FIG. 9 may not be able to also record and/or track a state associated with each participating event stream among the plurality M. Thus, the index x in this step is used in a regular or arbitrary manner or pattern for mapping the dust input with respective outputs of a transaction that is associated with a given event stream. The indices for an atomic blockchain transaction with M event streams will run from 0 to M−1.

In step 906*a*, for synchronising M participating event streams using an atomic blockchain transaction, the input and outputs follow a regular pattern where the dust input at index x is mapped or linked with an output stored at index 2x.

In step 908*a*, the state of a respective event stream $ES_n$ is then provided at output stored at index 2x+1.

Such mapping of the outputs to 2*x* and the state to 2*x*+1 is advantageous, as the first event stream $ES_{n=1}$, having index x=0 of a rendezvous or atomic transaction will be the same as a standard event stream blockchain transaction and can be tracked accordingly, and where additional streams can be tracked based on simple offsets of the input index x. Therefore, an auditor or verifying entity will be able to identify where a respective event stream's outputs are if it knows the index of its input, x. This index may be provided to the verifying entity by the platform processor or the index x may be obtained by scanning all the inputs of the event streams.

Instead of the above mapping pattern, it may be possible in some embodiments to arbitrarily map outputs (dust and OP_RETURN) using any pattern for a given input, if the platform processor or API records the chosen pattern and makes this available to the client and/or auditor. In addition, the OP_RETURN may contain the event stream state, and this may also include the starting transaction identified TxID, which allows an auditor to identify the OP_RETURN that belongs to a particular event stream $ES_n$.

In some embodiments, event streams that are involved in atomic or rendezvous transactions may frequently be involved in other atomic or rendezvous transactions, producing complex stream interactions. Therefore, in some embodiments it may be advantageous to record the dust input index and the dust output index as well as the data storage output index in each event stream, even though it will be possible and in some cases sufficient to record only the dust input index and derive the other two.

Figure 12:
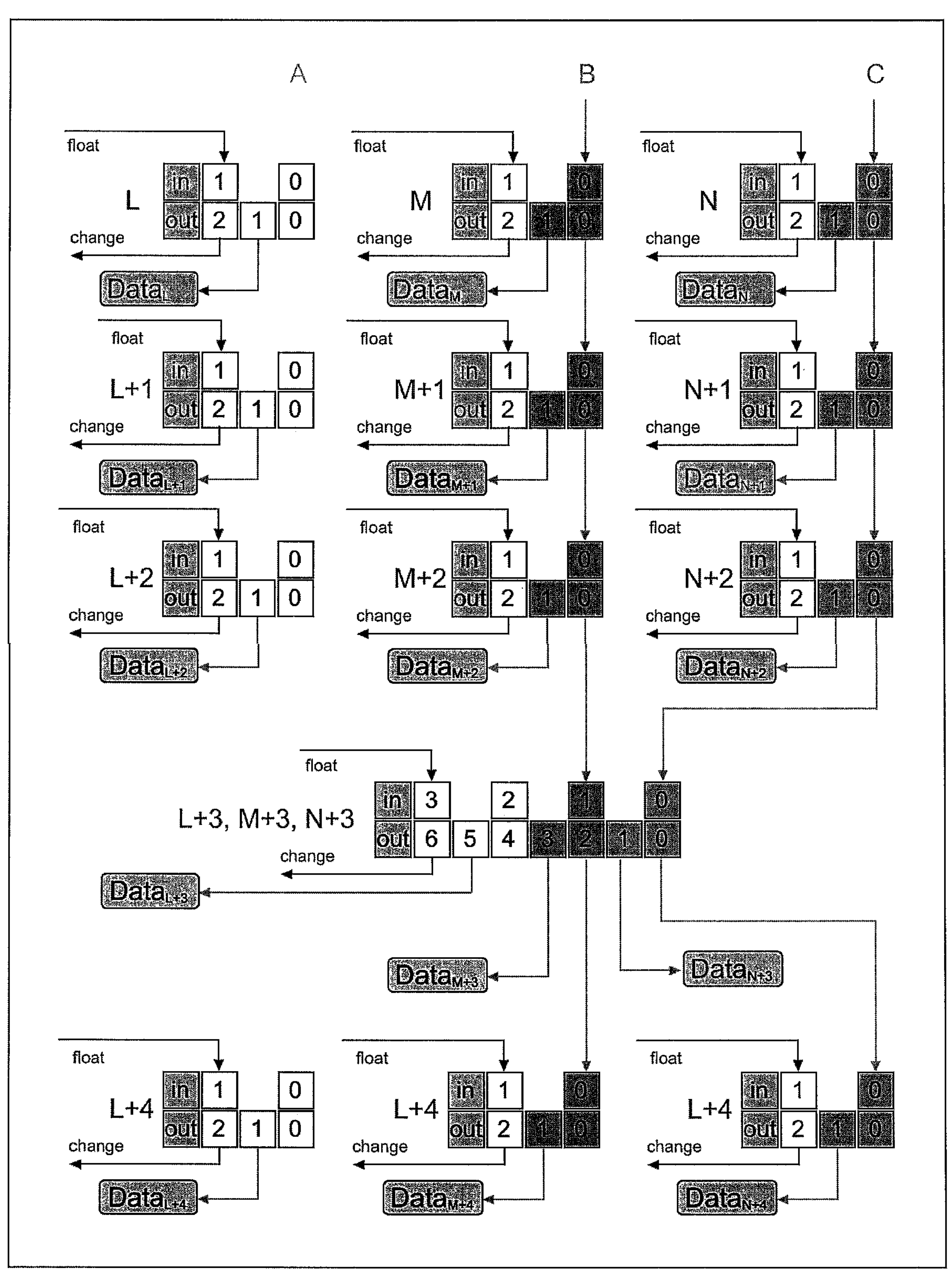
FIG. 12 is a schematic representation of the use of an atomic blockchain transaction for synchronising three event streams, followed by further processing of each event stream separately.

FIG. 12 shows an example of three event streams participating in a rendezvous or atomic blockchain transaction based on the method explained above in FIG. 9*a*.

In this figure A, B and C represent three regular event streams progressing separately. The first three rows represent three regular on-chain transactions (as set out in FIGS. 5 to 7 of the third aspect) and the fourth row represents a rendezvous or atomic transaction according to the fourth aspect, that synchronises these three event streams A, B and C together. Finally, the fifth row returns to the normal situation following synchronising.

In this figure, the arrangement of the input and outputs of C are identical, even as it flows through the rendezvous/atomic transaction. The A and B streams differ by the offset of their input index.

Based on the mapping to track the state of each event stream as explained in FIG. 9*a*, the input index x in the atomic transaction for event stream C in is x=0. The position of the atomic transaction in the respective stream A is given by N+3, with N being the first position or index for the event stream C.

Similarly, for stream B, the input index x in the atomic transaction for event stream B in is x=1. The position of the atomic transaction in the respective stream A is given by M+3, with M being the first position or index for the event stream B. Also, for stream A, the input index x in the atomic transaction for event stream A in is x=3. The position of the atomic transaction in the respective stream A is given by L+3, with L being the first position or index for the events stream A.

Therefore the mapping pattern for stream C is

Input at x=0

Output at 2x=0

State of C at 2x+1=1
The mapping pattern for stream B is
Input at x=1
Output at 2x=2
State of B at 2x+1=3
The mapping pattern for stream A is
Input at x=2
Output at 2x=4
State of A at 2x+1=5

Figure 10:
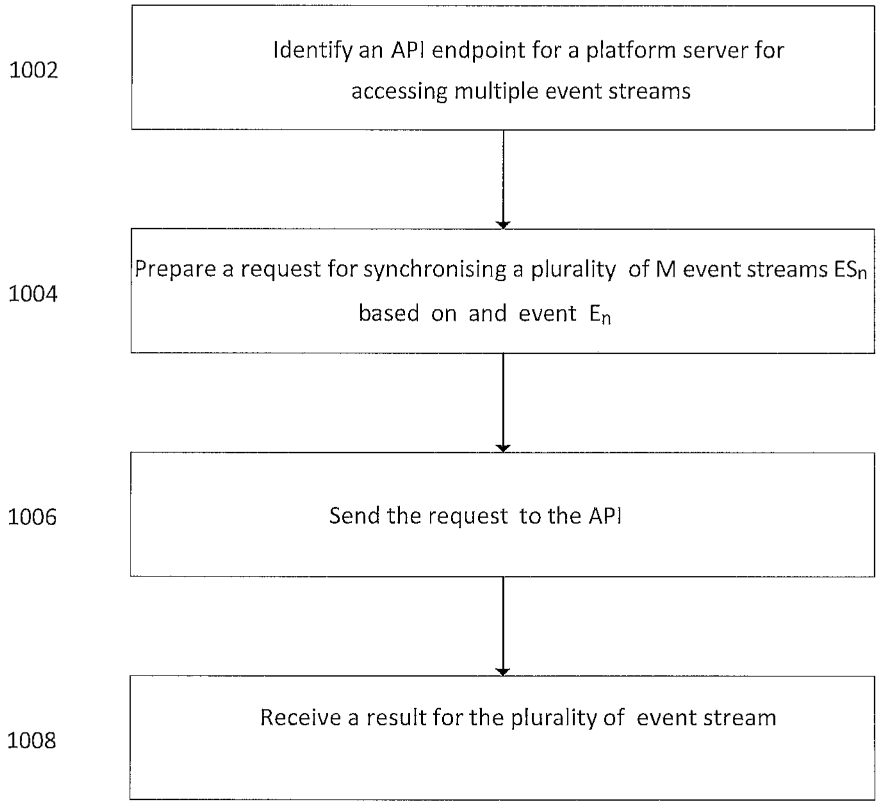
FIG. 10 is a flowchart, depicting a method for accessing a data-writing service for synchronising event streams associated with a blockchain, according to the fourth aspect, as implemented by one or more processors associated with a client.

FIG. 10 relates to the fourth aspect of the present disclosure and depicts a computer implemented method for accessing a platform or a data writing service for synchronising event streams associated with a blockchain, such as the platform 100 shown in FIG. 1 or platform 300 in FIG. 3. The method of FIG. 10 is implemented by one or more processors associated with a client.

In step 1002, the application programming interface (API) endpoint associated with the platform for synchronising event streams is identified. This API may be made available to the client by one or more known means of delivering APIs. As mentioned in relation to FIG. 8, this may be the API associated with a host platform processor for providing a data writing service, or may be a separate API specific for synchronising multiple event streams.

In step 1004, the client prepares a request associated with an event $E_n$ to synchronise or be appended to a plurality of M event streams $ES_{n=1\ to\ M}$. As mentioned above, the identifiers for the plurality of M events streams $ES_{n=1\ to\ M}$ and/or the target indices for each of the plurality of event streams may also be included in the request.

In step 1006, the request prepared in step 1004 is sent using a Hypertext Transfer Protocol (HTTP) or similar transmission protocol format, as the platform processor is implemented as a HTTP or REST API. This request is sent as a JSON object, as mentioned above in relation to FIG. 9.

In step 1008, a result is received pertaining to each of the M event streams. If the event $E_n$ was not appended to even one of the event streams among the plurality, then the result will be an error message. If the event $E_n$ was successfully appended to all of the M event streams, then in some embodiments, the API returns a response array with details of the current index or length for each of the plurality of event streams $ES_{n=1\ to\ M}$. In some embodiments a result associated with an output script of an atomic blockchain transaction for the event $E_n$ is also received. This result is provided to the client in the HTTP transmission protocol format. In some embodiments, the result may be saved in a log separately to the blockchain, either in or associated with the platform processor.

Figure 13:
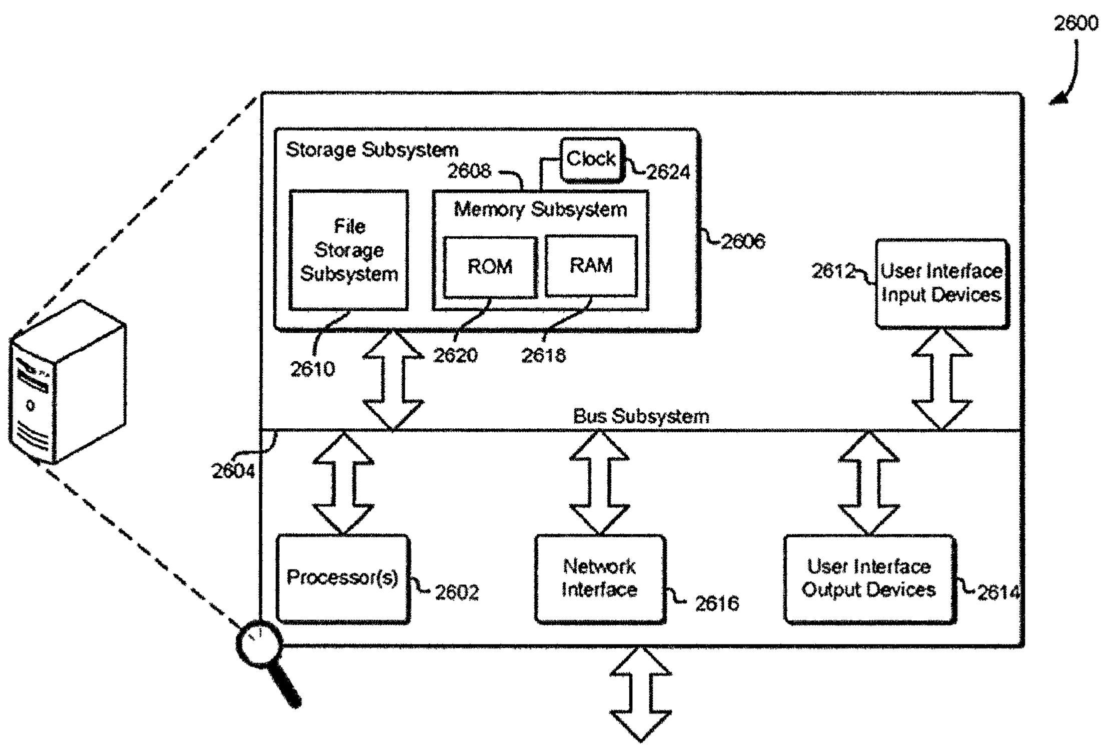
FIG. 13 is a schematic diagram, illustrating a computing environment in which various aspects and embodiments of the present disclosure can be implemented.

Turning now to FIG. 13, there is provided an illustrative, simplified block diagram of a computing device 2600 that may be used to practice at least one embodiment of the present disclosure. In various embodiments, the computing device 2600 may be used to implement any of the systems illustrated and described above. For example, the computing device 2600 may be configured to be used as one or more components of DBMS of figure, or the computing device 2600 may be configured to be a client entity that is associated with a given user, the client entity making database requests for a database that is managed by the DBMS of FIG. 13. Thus, computing device 2600 may be a portable computing device, a personal computer, or any electronic computing device. As shown in FIG. 13, the computing device 2600 may include one or more processors with one or more levels of cache memory and a memory controller (collectively labelled 2602) that can be configured to communicate with a storage subsystem 2606 that includes main memory 2608 and persistent storage 2610. The main memory 2608 can include dynamic random-access memory (DRAM) 2618 and read-only memory (ROM) 2620 as shown. The storage subsystem 2606 and the cache memory 2602 and may be used for storage of information, such as details associated with transactions and blocks as described in the present disclosure. The processor(s) 2602 may be utilized to provide the steps or functionality of any embodiment as described in the present disclosure.

The processor(s) 2602 can also communicate with one or more user interface input devices 2612, one or more user interface output devices 2614, and a network interface subsystem 2616.

A bus subsystem 2604 may provide a mechanism for enabling the various components and subsystems of computing device 2600 to communicate with each other as intended. Although the bus subsystem 2604 is shown schematically as a single bus, alternative embodiments of the bus subsystem may utilise multiple buses.

The network interface subsystem 2616 may provide an interface to other computing devices and networks. The network interface subsystem 2616 may serve as an interface for receiving data from, and transmitting data to, other systems from the computing device 2600. For example, the network interface subsystem 2616 may enable a data technician to connect the device to a network such that the data technician may be able to transmit data to the device and receive data from the device while in a remote location, such as a data centre.

The user interface input devices 2612 may include one or more user input devices such as a keyboard; pointing devices such as an integrated mouse, trackball, touchpad, or graphics tablet; a scanner; a barcode scanner; a touch screen incorporated into the display; audio input devices such as voice recognition systems, microphones; and other types of input devices. In general, use of the term "input device" is intended to include all possible types of devices and mechanisms for inputting information to the computing device 2600.

The one or more user interface output devices 2614 may include a display subsystem, a printer, or non-visual displays such as audio output devices, etc. The display subsystem may be a cathode ray tube (CRT), a flat-panel device such as a liquid crystal display (LCD), light emitting diode (LED) display, or a projection or other display device. In general, use of the term "output device" is intended to include all possible types of devices and mechanisms for outputting information from the computing device 2600. The one or more user interface output devices 2614 may be used, for example, to present user interfaces to facilitate user interaction with applications performing processes described and variations therein, when such interaction may be appropriate.

The storage subsystem 2606 may provide a computer-readable storage medium for storing the basic programming and data constructs that may provide the functionality of at least one embodiment of the present disclosure. The applications (programs, code modules, instructions), when executed by one or more processors, may provide the functionality of one or more embodiments of the present disclosure, and may be stored in the storage subsystem 2606. These application modules or instructions may be executed by the one or more processors 2602. The storage subsystem 2606 may additionally provide a repository for storing data used in accordance with the present disclosure. For example, the main memory 2608 and cache memory 2602 can provide volatile storage for program and data. The persistent storage 2610 can provide persistent (non-volatile) storage for program and data and may include flash memory, one or more solid state drives, one or more magnetic hard disk drives, one or more floppy disk drives with associated removable media, one or more optical drives (e.g. CD-ROM or DVD or Blue-Ray) drive with associated removable media, and other like storage media. Such program and data can include programs for carrying out the steps of one or more embodiments as described in the present disclosure as well as data associated with transactions and blocks as described in the present disclosure.

The computing device 2600 may be of various types, including a portable computer device, tablet computer, a workstation, or any other device described below. Additionally, the computing device 2600 may include another device that may be connected to the computing device 2600 through one or more ports (e.g., USB, a headphone jack, Lightning connector, etc.). The device that may be connected to the computing device 2600 may include a plurality of ports configured to accept fibre-optic connectors. Accordingly, this device may be configured to convert optical signals to electrical signals that may be transmitted through the port connecting the device to the computing device 2600 for processing. Due to the ever-changing nature of computers and networks, the description of the computing device 2600 depicted in FIG. 13 is intended only as a specific example for purposes of illustrating the preferred embodiment of the device. Many other configurations having more or fewer components than the system depicted in FIG. 13 are possible.

Enumerated Example Embodiments

The present disclosure is hereby discussed based on the following clauses that are related to the above aspects, which are provided herein as exemplary embodiments for better explaining, describing and understanding the claimed aspects and embodiments.

1. A computer implemented method for synchronising a plurality of event streams associated with a blockchain, the method implemented by a platform processor associated with an application programming interface (API), the method comprising the steps of:
   receiving a request from a client to update a plurality of existing event streams $ES_{n=1\ to\ M}$ associated with the blockchain, n being an integer from 1 to M, where M≥2 from the request, obtaining a current event $E_n$ to be appended to each event stream $ES_n$ among the plurality M of event streams $ES_{n=1\ to\ M}$;
   for each event stream $ES_n$, identifying a previous blockchain transaction $TX_{n-1}$ associated with the event stream $ES_n$; and
   creating an atomic blockchain transaction $TX_n$ for the current event $E_n$ to be appended to each event stream $ES_n$ among the plurality of M event streams $ES_{n=1\ to\ M}$ in order to synchronise the plurality M of event streams $ES_{n=1\ to\ M}$, the atomic blockchain transaction $TX_n$ comprising:
   n=M inputs, each $n^{th}$ input spending a dust output associated with the previous transaction $TX_{n-1}$ of the respective event stream $ES_n$,
   for each of the n inputs, a respective unspent transaction output ($UTXO_{n\_dust}$) being an $n^{th}$ dust output for the atomic transaction $TX_n$ associated with the respective event stream $ES_n$, and
   an unspent transaction output ($UTXO_{n\_data}$) associated with event data representing the current event $E_n$.
2. The method as set out in clause 1, wherein for each event stream $ES_n$ among the plurality of M event streams $ES_{n=1\ to\ M}$, the method comprises mapping an input associated with dust to a respective output based on an arbitrary or regular pattern, to track a state of the respective event stream $ES_n$.
3. The method as set out in clause 2, wherein when x is an index associated with the nth input for the respective stream $ES_n$, the regular pattern is provided by the steps of: mapping the dust of nth input at index x with an output stored at index 2x; and identifying the state of the event stream $ES_n$ based on an output stored at index 2x+1; wherein, the input indices x are provided from 0 to M−1 for the atomic blockchain transaction.
4. The method as set out in any preceding clause wherein the API is associated with a Hypertext Transfer Protocol (HTTP) endpoint, and wherein the request received from the client is based on a HTTP transmission protocol format.
5. The method as set out in any preceding clause wherein the endpoint is a separate and/or specific endpoint for synchronising the plurality of event streams.
6. The method as set out in any preceding clause comprising the step of identifying the plurality of event streams $ES_{n=1\ to\ M}$ based on an identifier for each event stream $ES_n$ among the plurality provided in the request from the client.
7. The method as set out in any proceeding clause comprising the step of obtaining a target index for one or more event stream $ES_n$ among the plurality of event streams $ES_{n=1\ to\ M}$ for appending the current event $E_n$.
8. The method as set out in clause 7 wherein the target index for the one or more event streams $ES_n$ among the plurality is provided in the request from the client.
9. The method as set out in any one of clauses 4 to 8 wherein the request is associated with a digital signature.
10. The method as set out in any one of clauses 7 or 8 wherein, based on a determination that an actual next available index value for an event stream $ES_n$ is the same as the target index for the respective event stream $ES_n$, the method includes:
   appending the current event $E_n$ to the respective event stream $ES_n$;
   otherwise, the method includes generating an error notification.
11. The method as set out in any preceding clause comprising the step of locking each event stream $ES_n$ associated with the request from the client until the current event $E_n$ has been appended to each of the plurality of M event streams $ES_{n=1\ to\ M}$, or until an error message is generated for one or more of the event streams in said plurality.
12. The method as set out in any preceding clause wherein a dust input index for each of the n=M inputs of the atomic blockchain transaction is recorded in the respective event stream $ES_n$ associated with the $n^{th}$ input.
13. The method as set out in clause 10 wherein a dust output index and/or an event data index for each of the n=M inputs of the atomic blockchain transaction is recorded in the respective event stream $ES_n$ associated with the $n^{th}$ input.

14, The method as set out in any preceding clause wherein, for each event stream $ES_n$ among the plurality M of event streams, the method comprises creating a key pair specific to each index associated with the respective event stream $ES_n$.

14. The method as set out in any preceding clause wherein, each event stream $ES_n$ among the plurality M of event streams is associated with a key chain K such that $K=K_{0\ to\ i}$, where i is an integer representing a current index value or length or current number of events associated with the given event stream $ES_n$, the method comprising the steps of:

obtaining a key pair $K_{i+1}$ associated with the identified previous transaction $TX_{n-1}$ for the given event stream $ES_n$;

deriving a key pair $K_i$ for the current event $E_n$ for the given event stream $ES_n$;

wherein, the spend of the $n^{th}$ input for the atomic blockchain transaction $TX_n$ is authorised with the obtained key pair $K_{i-1}$ for the previous transaction of the respective event stream $ES_n$; and wherein each $n^{th}$ dust output is associated with a locking script secured with the derived key pair $K_i$ for the respective event stream $ES_n$.

15. The method as set out in any one of the preceding wherein the atomic blockchain transaction further comprises:

an input associated with a digital asset; and one or more change outputs associated with the digital asset.

16. The method as set out in clause 14 wherein the digital asset is associated with an operational float.

17. The method as set out in any preceding clause, comprising the step of:

responsive to appending the current event $E_n$ to each of the plurality of M event streams $ES_{n=1\ to\ M}$, obtaining a new current index value for each of the event streams $ES_n$;

providing a response array of the obtained new index values for the plurality M of event streams.

18. The method as set out in any preceding clause comprising:

submitting the atomic blockchain transaction $TX_n$ to the blockchain; and sending a result associated with each of the plurality of synchronised event streams $ES_{n=1\ to\ M}$ to the client.

19. The method as set out in clause 18 wherein the step of submitting comprises including the atomic transaction in a subsequent block associated with the blockchain to be mined.

20. The method as set out in any one of clauses 18 or 19, wherein the result associated with each of the plurality of event stream $ES_{n=1\ to\ M}$ includes a certificate confirming at least one of the following:

the atomic blockchain transaction identifier within which the event $E_n$ was submitted to the blockchain;

a Merkle inclusion proof of the atomic blockchain transaction to a header in the blockchain a copy of the block header in which said atomic blockchain transaction was included.

21. The method as set out in any one of clauses 18 to 20 wherein the result further includes the response array of clause 17.

22. The method as set out in any one of clauses 18 to 21 wherein the result is sent to the client based on a Hypertext Transfer Protocol (HTTP) transmission protocol format.

23. The method as claimed in any one of the preceding clauses wherein the event data associated with the current $E_n$ for synchronising the plurality of event streams $ES_{n=1\ to\ M}$ is the same for all event streams in the plurality.

24. The method as claimed in any one of clauses 1 to 22 wherein the event data associated with the current $E_n$ for synchronising the plurality of event streams $ES_{n=1\ to\ M}$ is different for at one or more of the event streams in the plurality of event streams.

25. The method as claimed in any one of the preceding clauses wherein the event data associated with the current $E_n$ for synchronising the plurality of event streams $ES_{n=1\ to\ M}$ comprises metadata.

26. The method as claimed in any one of clauses 1 to 22 wherein the event data associated with the current $E_n$ for synchronising the plurality of event streams $ES_{n=1\ to\ M}$ contains only metadata.

27. A computer implemented method for requesting synchronisation of a plurality of M event streams in a blockchain, where M≥2, the method implemented by one or more processors of a given client among a plurality of clients, the method comprising the steps of:

obtaining or identifying an application programming interface (API) endpoint associated with one or more processors associated with a platform for providing a data writing service for synchronising event streams;

sending a request for appending an event $E_n$ to the plurality of event stream, wherein the request is sent based on a Hypertext Transfer Protocol (HTTP) transmission protocol format; and receiving a result associated with an output script of an atomic blockchain transaction pertaining to the requested event $E_n$, said result being received based on the HTTP transmission protocol format.

28. The method as set out in clause 27 wherein identifiers for each of the plurality of M event streams are included in the request.

29. the method as set out in clause 27 or 28 comprising including a target index value for each of the plurality of M event streams in the request.

30. A computing device comprising a processor and memory, the memory including executable instructions that, as a result of execution by the processor, causes the device to perform the computer-implemented method as set out in any one of clauses 1 to 26, the computing device pertaining to a platform processor.

31. A computing device comprising a processor and memory, the memory including executable instructions that, as a result of execution by the processor, causes the device to perform the computer-implemented method as set out in any one of clauses 27 to 29, wherein the computing device is pertaining to a client.

32. A computer system comprising:

at least one platform processor communicatively coupled to at least one client via a wireless communication network, the at least one platform processor associated with an application programming interface(API) endpoint for processing HTTP requests from the at least one client, the at least one platform processor implemented in accordance with the computing device as set out in clause 306; and the at least one client being implemented in accordance with the computing device as set out in clause 31.

33. A computer-readable storage medium having stored thereon executable instructions that, as a result of being executed by a processor of a computer, cause the computer to perform the method of any one of clauses 1 to 29.

It should be noted that the above-mentioned aspects and embodiments illustrate rather than limit the disclosure, and that those skilled in the art will be capable of designing many alternative embodiments without departing from the scope of the disclosure as defined by the appended claims. In the claims, any reference signs placed in parentheses shall not be construed as limiting the claims. The word "comprising" and "comprises", and the like, does not exclude the presence of elements or steps other than those listed in any claim or the specification as a whole. In the present specification, "comprises" means "includes or consists of" and "comprising" means "including or consisting of". The singular reference of an element does not exclude the plural reference of such elements and vice-versa. The disclosure may be implemented by means of hardware comprising several distinct elements, and by means of a suitably programmed computer. In a device claim enumerating several means, several of these means may be embodied by one and the same item of hardware. The mere fact that certain measures are recited in mutually different dependent claims does not indicate that a combination of these measures cannot be used to advantage.

The invention claimed is:

1. A computer implemented method for synchronising a plurality of event streams, each event stream implemented as a plurality of linked blockchain transactions, the method implemented by a platform processor associated with an application programming interface (API), the method comprising the steps of:

receiving a request from a client to update a plurality of existing event streams associated with a blockchain;

from the request, obtaining a current event to be appended to each of said event streams;

for each said event stream, identifying the last blockchain transaction associated with the event stream; and creating a blockchain transaction for the current event to be appended to each event stream in order to synchronise the event streams, the blockchain transaction comprising:

for each said event stream:

an input spending a dust output associated with the last transaction of the event stream, and a respective unspent transaction output being a dust output associated with the respective event stream; and an unspent transaction output associated with event data representing the current event such that the blockchain transaction becomes the last transaction in each of the event streams.

2. The method of claim 1, wherein for each event stream among the plurality of event streams, the method comprises mapping an input associated with dust to a respective output based on an arbitrary or regular pattern, to track a state of the respective event stream.

3. The method of claim 2, wherein when x is an index associated with an input for a respective event stream, the regular pattern is provided by the steps of:

mapping the dust of input at index x with an output stored at index 2x; and identifying the state of the respective event stream based on an output stored at index 2x+1;

wherein, the input indices x are provided from 0 to M−1 for the blockchain transaction, M being the number of event streams.

4. The method of claim 1, wherein the API is associated with a Hypertext Transfer Protocol (HTTP) endpoint, and wherein:

the request received from the client is based on a HTTP transmission protocol format; and the endpoint is a separate or specific endpoint for synchronising the plurality of event streams.

5. The method of claim 1, comprising the step of obtaining a target index for one or more event stream among the plurality of event streams for appending the current event, and optionally wherein the target index for the one or more event streams among the plurality is provided in the request from the client.

6. The method of claim 4, wherein the request is associated with a digital signature.

7. The method of claim 5, wherein, based on a determination that an actual next available index value for an event stream is the same as the target index for the respective event stream, the method includes:

appending the current event to the respective event stream;

otherwise, the method includes generating an error notification.

8. The method of claim 1, comprising the step of locking each event stream associated with the request from the client until the current event has been appended to each of the plurality of M event streams, or until an error message is generated for one or more of the event streams in said plurality.

9. The method of claim 1, wherein a dust input index for each of the inputs of the blockchain transaction is recorded in the respective event stream associated with the input; and optionally wherein a dust output index or an event data index for each of the n=M inputs of the blockchain transaction is recorded in the respective event stream associated with the $n^{th}$ input.

10. The method of claim 1, wherein, for each event stream among the plurality of event streams, the method comprises creating a key pair specific to each index associated with the respective event stream.

11. The method of claim 1, wherein, each event stream among the plurality of event streams is associated with a key chain K such that $K=K_{0\ to\ i}$, where i is an integer representing a current index value or length or current number of events associated with the given event stream, the method comprising the steps of:

obtaining a key pair $K_{i-1}$ associated with the identified last transaction for the given event stream;

deriving a key pair $K_i$ for the current event for the given event stream; wherein:

the spend of the respective input is authorised with the obtained key pair $K_{i-1}$ for the last transaction of the respective event stream; and the respective dust output is associated with a locking script secured with the derived key pair $K_i$ for the respective event stream.

12. The method of claim 1, wherein the blockchain transaction further comprises:

an input associated with a digital asset, optionally wherein the digital asset is associated with an operational float; and one or more change outputs associated with the digital asset.

13. The method of claim 1, comprising the steps of:

responsive to appending the current event to each of the plurality of event streams, obtaining a new current index value for each of the event streams; and providing a response array of the obtained new index values for the plurality of event streams.

14. The method of claim 1, comprising:

submitting the blockchain transaction to the blockchain, optionally wherein the step of submitting comprises including the transaction in a subsequent block associated with the blockchain to be mined; and sending a result associated with each of the plurality of synchronised event streams to the client.

15. The method of claim 14, wherein the result associated with each of the plurality of event stream includes a certificate confirming at least one of the following:

the blockchain transaction identifier within which the event was submitted to the blockchain;

a Merkle inclusion proof of the blockchain transaction to a header in the blockchain; and a copy of the block header in which said blockchain transaction was included.

16. The method of claim 1, wherein at least one of:

the event data associated with the current for synchronising the plurality of event streams is the same for all event streams in the plurality;

the event data associated with the current event for synchronising the plurality of event streams is different for at one or more of the event streams in the plurality of event streams;

the event data associated with the current for synchronising the plurality of event streams comprises metadata; or the event data associated with the current for synchronising the plurality of event streams contains only metadata.

17. A computing device comprising a processor and memory, the memory including executable instructions that, as a result of execution by the processor, causes the computing device to perform a computer-implemented method for synchronising a plurality of event streams associated with a blockchain, the method implemented by a platform processor associated with an application programming interface (API), the method comprising the steps of:

receiving a request from a client to update a plurality of existing event streams associated with the blockchain;

from the request, obtaining a current event to be appended to each of said event streams;

for each said event stream, identifying the last blockchain transaction associated with the event stream; and creating a blockchain transaction for the current event to be appended to each event stream in order to synchronise the event streams, the blockchain transaction comprising:

for each said event stream:

an input spending a dust output associated with the last transaction of the event stream, and a respective unspent transaction output being a dust output for the transaction associated with the event stream; and an unspent transaction output associated with event data representing the current event, the computing device pertaining to a platform processor;

such that the blockchain transaction becomes the last transaction in each of the event streams.

18. A non-transitory computer-readable storage medium having stored thereon executable instructions that, as a result of being executed by a processor of a computer, cause the computer to perform a method for synchronising a plurality of event streams associated with a blockchain, the method implemented by a platform processor associated with an application programming interface (API), the method comprising the steps of:

receiving a request from a client to update a plurality of existing event streams associated with the blockchain, n being an integer from 1 to M, where M≥2 from the request, obtaining a current event to be appended to each event stream among the plurality M of event streams;

for each event stream, identifying a previous blockchain transaction associated with the event stream; and creating a blockchain transaction for the current event to be appended to each event stream among the plurality of M event streams in order to synchronise the plurality M of event streams, the blockchain transaction comprising:

for each said event stream:

an input spending a dust output associated with the last transaction of the event stream, and a respective unspent transaction output being a dust output for the transaction associated with the event stream; and an unspent transaction output associated with event data representing the current event;

such that the blockchain transaction becomes the last transaction in each of the event streams.

* * * * *